United States Patent
Bynum et al.

(10) Patent No.: US 12,008,631 B2
(45) Date of Patent: *Jun. 11, 2024

(54) IN-STORE ITEM ALERT ARCHITECTURE

(71) Applicant: RTC Industries, Inc., Rolling Meadows, IL (US)

(72) Inventors: Anthony Eugene Bynum, Wadsworth, IL (US); Bradley Thomas Johnson, Crystal Lake, IL (US)

(73) Assignee: RTC Industries, Inc., Rollings Meadows, IL (US)

( * ) Notice: Subject to any disclaimer, the term of this patent is extended or adjusted under 35 U.S.C. 154(b) by 268 days.

This patent is subject to a terminal disclaimer.

(21) Appl. No.: 17/511,673

(22) Filed: Oct. 27, 2021

(65) Prior Publication Data
US 2022/0122156 A1 Apr. 21, 2022

Related U.S. Application Data

(63) Continuation of application No. 16/540,689, filed on Aug. 14, 2019, now Pat. No. 11,188,973, which is a
(Continued)

(51) Int. Cl.
*G06Q 30/00* (2023.01)
*G01C 21/34* (2006.01)
(Continued)

(52) U.S. Cl.
CPC ..... *G06Q 30/0639* (2013.01); *G01C 21/3484* (2013.01); *G06Q 30/0261* (2013.01);
(Continued)

(58) Field of Classification Search
None
See application file for complete search history.

(56) References Cited

U.S. PATENT DOCUMENTS

| | | |
|---|---|---|
| 154,940 A | 9/1874 | Adams |
| 355,511 A | 1/1887 | Danner |

(Continued)

FOREIGN PATENT DOCUMENTS

| | | |
|---|---|---|
| AU | 2007233199 A1 | 10/2007 |
| BE | 906083 A2 | 4/1987 |

(Continued)

OTHER PUBLICATIONS

M. Garaus et al. "Shoppers' acceptance and perceptions of electronic shelf labels" Journal of Business Research 69 (2016) 3687-3692 (Year: 2016).*
(Continued)

*Primary Examiner* — Naeem U Haq
(74) *Attorney, Agent, or Firm* — Michael Best & Friedrich LLP

(57) ABSTRACT

A method and apparatus for alerting an individual is described. A determination as to whether an individual is within a sensing area of a first device is made. The first device may be configured to provide information about a product on a shelf on which the first device is attached. In response to determining that the individual is within the sensing area, a determination as to whether to notify an occurrence of the determination that the individual is within the sensing area of the first device to at least one second device is made. In response to determining to notify, a notification may be transmitted to the at least one second device that the individual is within the sensing area of the first device. An alert may be triggered at the at least one second device based upon the transmitted notification.

20 Claims, 15 Drawing Sheets

Related U.S. Application Data continuation of application No. 15/808,983, filed on Nov. 10, 2017, now Pat. No. 10,410,277, which is a continuation of application No. 13/785,082, filed on Mar. 5, 2013, now Pat. No. 9,818,148.

(51) Int. Cl.
  *G06Q 30/0251* (2023.01)
  *G06Q 30/0601* (2023.01)
  *G06Q 90/00* (2006.01)
  *H04W 4/021* (2018.01)

(52) U.S. Cl.
  CPC ............ *G06Q 90/20* (2013.01); *H04W 4/021* (2013.01); *G09G 2370/16* (2013.01); *G09G 2380/04* (2013.01)

(56) References Cited

U.S. PATENT DOCUMENTS

| | | |
|---|---|---|
| 632,231 A | 9/1899 | Blades |
| 808,067 A | 12/1905 | Briggs |
| 847,863 A | 3/1907 | Watts |
| 1,156,140 A | 10/1915 | Hair |
| 1,682,580 A | 8/1928 | Pratt |
| 1,703,987 A | 3/1929 | Butler |
| 1,712,080 A | 5/1929 | Kelly |
| 1,714,266 A | 5/1929 | Johnson |
| 1,734,031 A | 11/1929 | Carlston |
| 1,786,392 A | 12/1930 | Kemp |
| 1,964,597 A | 6/1934 | Rapellin |
| 1,971,749 A | 8/1934 | Hamilton |
| 1,991,102 A | 2/1935 | Kernaghan |
| 2,057,627 A | 10/1936 | Ferris |
| 2,079,754 A | 5/1937 | Waxgiser |
| 2,085,479 A | 6/1937 | Shaffer et al. |
| 2,110,299 A | 3/1938 | Hinkle |
| 2,111,496 A | 3/1938 | Scriba |
| 2,129,122 A | 9/1938 | Follett |
| 2,185,605 A | 1/1940 | Murphy |
| 2,218,444 A | 10/1940 | Vineyard |
| 2,499,088 A | 2/1950 | Brill |
| 2,516,122 A | 7/1950 | Hughes |
| 2,538,165 A | 1/1951 | Randtke |
| 2,555,102 A | 5/1951 | Anderson |
| 2,563,570 A | 8/1951 | Williams |
| 2,652,154 A | 9/1953 | Stevens |
| 2,670,853 A | 3/1954 | Schneider |
| 2,678,045 A | 5/1954 | Erhard |
| 2,732,952 A | 1/1956 | Skelton |
| 2,738,881 A | 3/1956 | Michel |
| 2,750,049 A | 6/1956 | Hunter |
| 2,775,365 A | 12/1956 | Mestman |
| 2,893,596 A | 7/1959 | Gabrielsen |
| 2,918,295 A | 12/1959 | Milner |
| 2,934,212 A | 4/1960 | Jacobson |
| 2,948,403 A | 8/1960 | Vallez |
| 2,964,154 A | 12/1960 | Erickson |
| 3,083,067 A | 3/1963 | Vos et al. |
| 3,103,396 A | 9/1963 | Portnoy |
| 3,151,576 A | 10/1964 | Patterson |
| 3,161,295 A | 12/1964 | Chesley |
| 3,166,195 A | 1/1965 | Taber |
| 3,285,429 A | 11/1966 | Propst |
| 3,308,961 A | 3/1967 | Chesley |
| 3,308,964 A | 3/1967 | Pistone |
| 3,348,732 A | 10/1967 | Shwarz |
| 3,405,716 A | 10/1968 | Cafiero |
| 3,452,899 A | 7/1969 | Libberton |
| 3,481,482 A | 12/1969 | Wilkens |
| 3,497,081 A | 2/1970 | Field |
| 3,501,020 A | 3/1970 | Krikorian |
| D219,058 S | 10/1970 | Kaczur |
| 3,550,979 A | 12/1970 | Protzmann |
| 3,598,246 A | 8/1971 | Galli |
| 3,652,154 A | 3/1972 | Gebel |
| 3,667,826 A | 6/1972 | Wood |
| 3,698,568 A | 10/1972 | Armstrong |
| 3,709,371 A | 1/1973 | Luck |
| 3,724,715 A | 4/1973 | Auriemma |
| 3,751,129 A | 8/1973 | Wright et al. |
| 3,767,083 A | 10/1973 | Webb |
| 3,814,490 A | 6/1974 | Dean et al. |
| 3,815,519 A | 6/1974 | Meyer |
| 3,830,169 A | 8/1974 | Madey |
| 3,848,745 A | 11/1974 | Smith |
| 3,868,021 A | 2/1975 | Heinrich |
| 3,870,156 A | 3/1975 | O'Neill |
| 4,007,841 A | 2/1977 | Seipel |
| 4,042,096 A | 8/1977 | Smith |
| 4,106,668 A | 8/1978 | Gebhardt et al. |
| 4,269,326 A | 5/1981 | Delbrouck |
| 4,300,693 A | 11/1981 | Spamer |
| 4,303,162 A | 12/1981 | Suttles |
| 4,314,700 A | 2/1982 | Dylag |
| 4,331,243 A | 5/1982 | Doll |
| 4,351,439 A | 9/1982 | Taylor |
| 4,378,872 A | 4/1983 | Brown |
| 4,448,653 A | 5/1984 | Wegmann |
| 4,454,948 A | 6/1984 | Spamer |
| 4,460,096 A | 7/1984 | Ricci |
| 4,463,854 A | 8/1984 | MacKenzie |
| 4,467,927 A | 8/1984 | Nathan |
| 4,476,985 A | 10/1984 | Norberg et al. |
| 4,482,066 A | 11/1984 | Dykstra |
| 4,488,653 A | 12/1984 | Belokin |
| 4,504,100 A | 3/1985 | Chaumard |
| 4,588,093 A | 5/1986 | Field |
| 4,589,349 A | 5/1986 | Gebhardt et al. |
| 4,602,560 A | 7/1986 | Jacky |
| 4,615,276 A | 10/1986 | Garabedian |
| 4,620,489 A | 11/1986 | Albano |
| 4,629,072 A | 12/1986 | Loew |
| 4,651,883 A | 3/1987 | Gullett et al. |
| 4,685,574 A | 8/1987 | Young et al. |
| 4,705,175 A | 11/1987 | Howard et al. |
| 4,706,821 A | 11/1987 | Kohls et al. |
| 4,724,968 A | 2/1988 | Wombacher |
| 4,729,481 A | 3/1988 | Hawkinson et al. |
| 4,730,741 A | 3/1988 | Jackle, III et al. |
| 4,742,936 A | 5/1988 | Rein |
| 4,762,235 A | 8/1988 | Howard et al. |
| 4,762,236 A | 8/1988 | Jackle, III et al. |
| 4,768,661 A | 9/1988 | Pfeifer |
| 4,775,058 A | 10/1988 | Yatsko |
| 4,776,472 A | 10/1988 | Rosen |
| 4,790,037 A | 12/1988 | Phillips |
| 4,809,856 A | 3/1989 | Muth |
| 4,828,144 A | 5/1989 | Garrick |
| 4,830,201 A | 5/1989 | Breslow |
| 4,836,390 A | 6/1989 | Polvere |
| 4,846,367 A | 7/1989 | Guigan et al. |
| 4,883,169 A | 11/1989 | Flanagan, Jr. |
| 4,899,668 A | 2/1990 | Valiulis |
| 4,901,853 A | 2/1990 | Maryatt |
| 4,901,869 A | 2/1990 | Hawkinson et al. |
| 4,907,707 A | 3/1990 | Crum |
| 4,934,645 A | 6/1990 | Breslow |
| 4,954,697 A | 9/1990 | Kokubun et al. |
| 5,009,334 A | 4/1991 | Bodkins |
| 5,012,936 A | 5/1991 | Crum |
| 5,025,936 A | 6/1991 | Lamoureaux |
| 5,027,957 A | 7/1991 | Skalski |
| 5,082,125 A | 1/1992 | Ninni |
| 5,088,607 A | 2/1992 | Risafi et al. |
| 5,110,192 A | 5/1992 | Lauterbach |
| 5,111,942 A | 5/1992 | Bernardin |
| 5,123,546 A | 6/1992 | Crum |
| 5,148,927 A | 9/1992 | Gebka |
| 5,161,702 A | 11/1992 | Skalski |
| 5,172,314 A | 12/1992 | Poland et al. |
| 5,178,258 A | 1/1993 | Smalley et al. |
| 5,183,166 A | 2/1993 | Belokin, Jr. et al. |
| 5,190,186 A | 3/1993 | Yablans et al. |

(56) References Cited

U.S. PATENT DOCUMENTS

| | | | |
|---|---|---|---|
| 5,203,463 A | 4/1993 | Gold | |
| 5,215,199 A | 6/1993 | Bejarano | |
| 5,240,126 A | 8/1993 | Foster et al. | |
| 5,255,802 A | 10/1993 | Krinke et al. | |
| 5,257,090 A | 10/1993 | Meinzer et al. | |
| 5,265,738 A | 11/1993 | Yablans et al. | |
| 5,316,154 A | 5/1994 | Hajec, Jr. | |
| 5,341,945 A | 8/1994 | Gibson | |
| 5,351,839 A | 10/1994 | Beeler et al. | |
| 5,366,099 A | 11/1994 | Schmid | |
| 5,381,908 A | 1/1995 | Hepp | |
| 5,390,802 A | 2/1995 | Pappagallo et al. | |
| 5,413,229 A | 5/1995 | Zuberbuhler et al. | |
| 5,415,297 A | 5/1995 | Klein et al. | |
| 5,448,226 A | 9/1995 | Failing, Jr. et al. | |
| 5,450,969 A | 9/1995 | Johnson et al. | |
| 5,458,248 A | 10/1995 | Alain | |
| 5,464,105 A | 11/1995 | Mandeltort | |
| 5,469,975 A | 11/1995 | Fajnsztajn | |
| 5,469,976 A | 11/1995 | Burchell | |
| 5,537,312 A | 7/1996 | Sekiguchi et al. | |
| 5,542,552 A | 8/1996 | Yablans et al. | |
| 5,548,282 A | 8/1996 | Escritt et al. | |
| 5,562,217 A | 10/1996 | Salveson et al. | |
| 5,613,621 A | 3/1997 | Gervasi et al. | |
| D378,888 S | 4/1997 | Bertilsson | |
| 5,615,780 A | 4/1997 | Nimetz et al. | |
| 5,634,564 A | 6/1997 | Spamer et al. | |
| 5,638,963 A | 6/1997 | Finnelly et al. | |
| 5,665,304 A | 9/1997 | Heinen et al. | |
| 5,671,362 A | 9/1997 | Cowe et al. | |
| 5,671,851 A | 9/1997 | Johnson et al. | |
| 5,673,801 A | 10/1997 | Markson | |
| D386,363 S | 11/1997 | Dardashti | |
| 5,685,664 A | 11/1997 | Parham et al. | |
| 5,702,008 A | 12/1997 | Thalenfeld et al. | |
| 5,711,432 A | 1/1998 | Stein et al. | |
| 5,730,320 A | 3/1998 | David | |
| 5,737,504 A | 4/1998 | Yamada | |
| 5,738,019 A | 4/1998 | Parker | |
| 5,740,944 A | 4/1998 | Crawford | |
| 5,743,428 A | 4/1998 | Rankin, VI | |
| 5,746,328 A | 5/1998 | Beeler et al. | |
| 5,788,090 A | 8/1998 | Kajiwara | |
| 5,804,276 A | 9/1998 | Vogler | |
| 5,804,810 A * | 9/1998 | Woolley | G06Q 10/08 235/383 |
| 5,826,731 A | 10/1998 | Dardashti | |
| 5,839,588 A | 11/1998 | Hawkinson | |
| 5,855,283 A | 1/1999 | Johnson | |
| 5,859,414 A | 1/1999 | Grimes et al. | |
| 5,873,473 A | 2/1999 | Pater | |
| 5,878,895 A | 3/1999 | Springs | |
| 5,880,449 A | 3/1999 | Teicher et al. | |
| 5,906,283 A | 5/1999 | Kump et al. | |
| 5,933,813 A | 8/1999 | Teicher et al. | |
| 5,963,134 A | 10/1999 | Bowers et al. | |
| 5,971,204 A | 10/1999 | Apps | |
| 5,992,652 A | 11/1999 | Springs | |
| 5,992,653 A | 11/1999 | Anderson et al. | |
| 6,006,678 A | 12/1999 | Merit et al. | |
| 6,041,720 A | 3/2000 | Hardy | |
| 6,076,670 A | 6/2000 | Yeranossian | |
| 6,082,557 A | 7/2000 | Leahy | |
| 6,082,558 A | 7/2000 | Battaglia | |
| 6,089,385 A | 7/2000 | Nozawa | |
| 6,105,004 A | 8/2000 | Halperin et al. | |
| 6,105,791 A | 8/2000 | Chalson et al. | |
| 6,112,938 A | 9/2000 | Apps | |
| 6,124,851 A | 9/2000 | Jacobson | |
| 6,129,218 A | 10/2000 | Henry et al. | |
| 6,142,317 A | 11/2000 | Merl | |
| 6,158,598 A | 12/2000 | Josefsson | |
| 6,164,491 A | 12/2000 | Bustos et al. | |
| 6,173,845 B1 | 1/2001 | Higgins et al. | |
| 6,209,733 B1 | 4/2001 | Higgins et al. | |
| 6,227,385 B1 | 5/2001 | Nickerson | |
| 6,234,325 B1 | 5/2001 | Higgins et al. | |
| 6,234,326 B1 | 5/2001 | Higgins et al. | |
| 6,234,328 B1 | 5/2001 | Mason | |
| 6,253,190 B1 | 6/2001 | Sutherland | |
| D445,615 S | 7/2001 | Burke | |
| 6,253,954 B1 | 7/2001 | Yasaka | |
| 6,269,285 B1 | 7/2001 | Mignault | |
| 6,289,326 B1 | 9/2001 | LaFleur | |
| 6,357,606 B1 | 3/2002 | Henry | |
| 6,378,727 B1 | 4/2002 | Dupuis et al. | |
| 6,382,431 B1 | 5/2002 | Burke | |
| 6,389,991 B1 | 5/2002 | Morrisson | |
| 6,401,942 B1 | 6/2002 | Eckert | |
| 6,405,880 B1 | 6/2002 | Webb | |
| 6,409,026 B2 | 6/2002 | Watanabe | |
| 6,409,027 B1 | 6/2002 | Chang et al. | |
| 6,409,028 B2 | 6/2002 | Nickerson | |
| 6,464,089 B1 | 10/2002 | Rankin, VI | |
| 6,484,891 B2 | 11/2002 | Burke | |
| 6,497,326 B1 | 12/2002 | Osawa | |
| 6,497,367 B2 | 12/2002 | Conzola et al. | |
| 6,507,352 B1 | 1/2003 | Cohen et al. | |
| 6,513,677 B1 | 2/2003 | Sorensen et al. | |
| 6,523,664 B2 | 2/2003 | Shaw et al. | |
| 6,523,703 B1 | 2/2003 | Robertson | |
| 6,527,127 B2 | 3/2003 | Dumontet | |
| 6,533,131 B2 | 3/2003 | Bada | |
| 6,536,658 B2 | 3/2003 | Rantze | |
| D472,411 S | 4/2003 | Burke | |
| 6,550,674 B1 | 4/2003 | Neumark | |
| 6,598,754 B2 | 7/2003 | Weiler | |
| 6,622,874 B1 | 9/2003 | Hawkinson | |
| 6,655,536 B2 | 12/2003 | Jo et al. | |
| 6,666,533 B1 | 12/2003 | Stavros | |
| D485,699 S | 1/2004 | Mueller et al. | |
| 6,717,516 B2 | 4/2004 | Bridgelall | |
| 6,738,628 B1 | 5/2004 | McCall et al. | |
| 6,772,888 B2 | 8/2004 | Burke | |
| 6,830,157 B2 | 12/2004 | Robertson et al. | |
| 6,866,156 B2 | 3/2005 | Nagel et al. | |
| 6,886,699 B2 | 5/2005 | Johnson et al. | |
| 6,889,854 B2 | 5/2005 | Burke | |
| 6,897,763 B2 | 5/2005 | Schulmerich et al. | |
| 6,914,648 B2 | 7/2005 | Niiyama et al. | |
| 6,948,900 B1 | 9/2005 | Neuman | |
| 6,964,235 B2 | 11/2005 | Hardy | |
| 7,002,451 B2 | 2/2006 | Freeman | |
| 7,084,769 B2 | 8/2006 | Bauer et al. | |
| 7,090,125 B2 | 8/2006 | Goel et al. | |
| 7,093,546 B2 | 8/2006 | Hardy | |
| 7,114,606 B2 | 10/2006 | Shaw et al. | |
| 7,152,040 B1 | 12/2006 | Hawthorne et al. | |
| 7,152,791 B2 | 12/2006 | Chappidi et al. | |
| 7,155,238 B2 | 12/2006 | Katz | |
| 7,216,770 B2 | 5/2007 | Mueller et al. | |
| 7,252,230 B1 | 8/2007 | Sheikh et al. | |
| 7,319,397 B2 | 1/2008 | Chung et al. | |
| 7,400,251 B2 | 7/2008 | Czyszczewski et al. | |
| 7,458,473 B1 | 12/2008 | Mason | |
| 7,493,336 B2 | 2/2009 | Noonan | |
| 7,520,429 B2 | 4/2009 | Koster | |
| 7,526,762 B1 | 4/2009 | Astala et al. | |
| 7,542,283 B1 | 6/2009 | Curran et al. | |
| 7,565,108 B2 | 7/2009 | Kotola et al. | |
| 7,580,845 B2 | 8/2009 | Burman et al. | |
| 7,614,065 B2 | 11/2009 | Weissmueller, Jr. et al. | |
| 7,641,057 B2 | 1/2010 | Mueller et al. | |
| 7,675,422 B2 | 3/2010 | Stevens et al. | |
| 7,686,185 B2 | 3/2010 | Zychinski | |
| 7,743,984 B2 | 6/2010 | Olsen et al. | |
| 7,768,399 B2 | 8/2010 | Hachmann et al. | |
| 7,775,130 B2 | 8/2010 | Harish et al. | |
| 7,775,430 B2 | 8/2010 | Lin | |
| 7,792,711 B2 | 9/2010 | Swafford, Jr. et al. | |
| 7,815,060 B2 | 10/2010 | Iellimo | |
| 7,823,734 B2 | 11/2010 | Hardy | |
| 7,837,106 B2 | 11/2010 | Fabre et al. | |

(56) References Cited

U.S. PATENT DOCUMENTS

| | | |
|---|---|---|
| 7,853,477 B2 | 12/2010 | O'Shea et al. |
| 7,864,041 B2 | 1/2011 | Godlewski |
| 7,896,172 B1 | 3/2011 | Hester |
| 7,904,333 B1 | 3/2011 | Perkowski |
| 7,982,622 B2 | 7/2011 | Burchell et al. |
| 8,047,385 B2 | 11/2011 | Hardy |
| 8,089,357 B2 | 1/2012 | Irmscher et al. |
| 8,135,482 B2 | 3/2012 | Caldwell et al. |
| 8,144,245 B2 | 3/2012 | Vik |
| 8,171,142 B2 | 5/2012 | Kolin et al. |
| 8,184,005 B2 | 5/2012 | Kamel |
| 8,207,819 B2 | 6/2012 | Bonner et al. |
| 8,219,558 B1 | 7/2012 | Trandal et al. |
| 8,231,017 B2 | 7/2012 | Clontz et al. |
| 8,255,500 B2 | 8/2012 | Cacheria, III et al. |
| 8,280,784 B2 | 10/2012 | Hurtis et al. |
| 8,284,059 B2 | 10/2012 | Ross |
| 8,284,061 B1 | 10/2012 | Dione |
| 8,312,999 B2 | 11/2012 | Hardy |
| 8,321,302 B2 | 11/2012 | Bauer et al. |
| 8,322,544 B2 | 12/2012 | Hardy |
| 8,342,340 B2 | 1/2013 | Rataiczak, III et al. |
| 8,376,154 B2 | 2/2013 | Sun |
| 8,410,931 B2 | 4/2013 | Petite et al. |
| 8,443,988 B2 | 5/2013 | Niederhuefner |
| 8,463,431 B2 | 6/2013 | Segal et al. |
| 8,489,452 B1 | 7/2013 | Warner et al. |
| 8,534,469 B2 | 9/2013 | Northrup, Jr. et al. |
| 8,602,224 B2 | 12/2013 | Casey |
| 8,629,772 B2 | 1/2014 | Valiulis et al. |
| 8,662,320 B2 | 3/2014 | Csak |
| 8,662,325 B2 | 3/2014 | Davis et al. |
| 8,698,606 B2 | 4/2014 | Choi et al. |
| 8,739,984 B2 | 6/2014 | Hardy |
| 8,751,318 B2 | 6/2014 | Kim et al. |
| 8,781,622 B2 | 7/2014 | Mockus et al. |
| 8,803,687 B2 | 8/2014 | Valiulis et al. |
| 8,810,392 B1 | 8/2014 | Teller et al. |
| 8,823,521 B2 | 9/2014 | Overhultz et al. |
| 8,844,431 B2 | 9/2014 | Davis et al. |
| 8,978,904 B2 | 3/2015 | Hardy |
| 9,072,394 B2 | 7/2015 | Hardy |
| 9,167,913 B2 | 10/2015 | Hardy |
| 9,167,916 B2 | 10/2015 | Grant et al. |
| 9,275,361 B2 | 3/2016 | Meyer |
| 9,318,007 B2 | 4/2016 | Valiulis et al. |
| 9,318,008 B2 | 4/2016 | Valiulis et al. |
| 9,386,864 B2 | 7/2016 | Pongrac et al. |
| 9,468,315 B2 | 10/2016 | Ha et al. |
| 9,576,417 B2 | 2/2017 | Christianson |
| 9,697,709 B2 | 7/2017 | King et al. |
| 9,706,857 B2 | 7/2017 | Hardy et al. |
| 9,820,587 B1 | 11/2017 | Cheng et al. |
| 9,898,712 B2 | 2/2018 | Johnson et al. |
| 10,007,892 B1 | 6/2018 | Hahn et al. |
| 10,210,478 B2 | 2/2019 | Johnson et al. |
| 10,262,293 B1 | 4/2019 | Prater et al. |
| 10,271,666 B2 | 4/2019 | Taylor et al. |
| 10,334,964 B2 | 7/2019 | Hachmann |
| 10,410,277 B2 | 9/2019 | Bynum et al. |
| 10,420,427 B2 | 9/2019 | Hachmann |
| 10,891,675 B2 * | 1/2021 | De Haas ................ G06Q 20/20 |
| 11,494,821 B2 * | 11/2022 | High ........................ G09G 3/20 |
| 2001/0010302 A1 | 8/2001 | Nickerson |
| 2001/0017284 A1 | 8/2001 | Watanabe |
| 2001/0051901 A1 | 12/2001 | Hager et al. |
| 2002/0036178 A1 | 3/2002 | Tombu |
| 2002/0108916 A1 | 8/2002 | Nickerson |
| 2002/0109593 A1 | 8/2002 | Swartzel et al. |
| 2002/0148794 A1 | 10/2002 | Marihugh |
| 2002/0158133 A1 | 10/2002 | Conzola et al. |
| 2002/0170866 A1 | 11/2002 | Johnson et al. |
| 2002/0178013 A1 | 11/2002 | Hoffman et al. |
| 2003/0000956 A1 | 1/2003 | Maldonado |
| 2003/0010732 A1 | 1/2003 | Burke |
| 2003/0053014 A1 | 3/2003 | Niiyama et al. |
| 2003/0055727 A1 | 3/2003 | Walker et al. |
| 2003/0057167 A1 | 3/2003 | Johnson et al. |
| 2003/0061973 A1 | 4/2003 | Bustos |
| 2003/0078691 A1 | 4/2003 | Holt et al. |
| 2003/0085187 A1 | 5/2003 | Johnson et al. |
| 2003/0106867 A1 | 6/2003 | Caterinacci |
| 2003/0141265 A1 | 7/2003 | Jo et al. |
| 2003/0150829 A1 | 8/2003 | Linden et al. |
| 2003/0193481 A1 | 10/2003 | Sokolsky |
| 2003/0217980 A1 | 11/2003 | Johnson et al. |
| 2003/0233288 A1 | 12/2003 | Sweeney et al. |
| 2004/0104239 A1 | 6/2004 | Black et al. |
| 2004/0118795 A1 | 6/2004 | Burke |
| 2004/0119681 A1 | 6/2004 | Albert et al. |
| 2004/0140278 A1 | 7/2004 | Mueller et al. |
| 2004/0140279 A1 | 7/2004 | Mueller et al. |
| 2004/0145451 A1 | 7/2004 | Failing |
| 2004/0178156 A1 | 9/2004 | Knorring et al. |
| 2004/0245197 A1 | 12/2004 | McElvaney |
| 2004/0260572 A1 | 12/2004 | George et al. |
| 2005/0040123 A1 | 2/2005 | Ali |
| 2005/0077259 A1 | 4/2005 | Menz |
| 2005/0086133 A1 | 4/2005 | Scherer et al. |
| 2005/0092702 A1 | 5/2005 | Nagel |
| 2005/0108098 A1 | 5/2005 | Syed et al. |
| 2005/0131578 A1 | 6/2005 | Weaver |
| 2005/0149414 A1 | 7/2005 | Schrodt et al. |
| 2005/0165649 A1 | 7/2005 | Mahaffey et al. |
| 2005/0168345 A1 | 8/2005 | Swafford et al. |
| 2005/0190072 A1 | 9/2005 | Brown et al. |
| 2005/0195081 A1 | 9/2005 | Studnicki et al. |
| 2005/0228718 A1 | 10/2005 | Austin |
| 2005/0279722 A1 | 12/2005 | Ali |
| 2006/0049122 A1 | 3/2006 | Mueller et al. |
| 2006/0071774 A1 | 4/2006 | Brown et al. |
| 2006/0102718 A1 | 5/2006 | Kajino et al. |
| 2006/0131401 A1 | 6/2006 | Do et al. |
| 2006/0135843 A1 | 6/2006 | Heath |
| 2006/0157431 A1 | 7/2006 | Nagelski et al. |
| 2006/0163272 A1 | 7/2006 | Gamble |
| 2006/0163349 A1 | 7/2006 | Neugebauer |
| 2006/0186064 A1 | 8/2006 | Merit et al. |
| 2006/0237381 A1 | 10/2006 | Lockwood et al. |
| 2006/0279527 A1 | 12/2006 | Zehner et al. |
| 2006/0289637 A1 | 12/2006 | Brice et al. |
| 2007/0016494 A1 | 1/2007 | Brown et al. |
| 2007/0023511 A1 | 2/2007 | Smith et al. |
| 2007/0024551 A1 | 2/2007 | Gelbman |
| 2007/0034581 A1 | 2/2007 | Weck et al. |
| 2007/0043600 A1 | 2/2007 | Solomon |
| 2007/0095903 A1 | 5/2007 | Suenbuel |
| 2007/0159298 A1 | 7/2007 | Zegelin et al. |
| 2007/0194037 A1 | 8/2007 | Close |
| 2007/0278164 A1 | 12/2007 | Lang et al. |
| 2007/0283615 A1 | 12/2007 | Mastakis et al. |
| 2007/0289344 A1 | 12/2007 | Fawcett et al. |
| 2008/0074264 A1 | 3/2008 | Sharpe et al. |
| 2008/0136647 A1 | 6/2008 | Brown |
| 2008/0142458 A1 | 6/2008 | Medcalf |
| 2008/0164310 A1 | 7/2008 | Dupuy et al. |
| 2008/0208695 A1 | 8/2008 | Condron |
| 2008/0228346 A1 | 9/2008 | Lucas et al. |
| 2008/0249658 A1 | 10/2008 | Walker et al. |
| 2008/0250464 A1 | 10/2008 | Masucci et al. |
| 2008/0255894 A1 | 10/2008 | Falls et al. |
| 2008/0255960 A1 | 10/2008 | Nguyen |
| 2008/0303637 A1 | 12/2008 | Gelbman et al. |
| 2009/0020548 A1 | 1/2009 | VanDruff |
| 2009/0084812 A1 | 4/2009 | Kirschner |
| 2009/0095695 A1 | 4/2009 | Moock et al. |
| 2009/0101606 A1 | 4/2009 | Olson |
| 2009/0133301 A1 | 5/2009 | Saxena et al. |
| 2009/0134103 A1 | 5/2009 | Saxena et al. |
| 2009/0139945 A1 | 6/2009 | Jacobson et al. |
| 2009/0157515 A1 | 6/2009 | Lafauci et al. |
| 2009/0179825 A1 | 7/2009 | Enarvi et al. |
| 2009/0248198 A1 | 10/2009 | Siegel et al. |
| 2009/0287992 A1 | 11/2009 | Bresolin et al. |

(56) References Cited

U.S. PATENT DOCUMENTS

| | | |
|---|---|---|
| 2009/0313365 A1 | 12/2009 | Whitehead |
| 2009/0319399 A1 | 12/2009 | Resta et al. |
| 2010/0017025 A1 | 1/2010 | Lockwood et al. |
| 2010/0023401 A1 | 1/2010 | Ariyibi |
| 2010/0057541 A1 | 3/2010 | Bonner et al. |
| 2010/0072152 A1 | 3/2010 | Kim |
| 2010/0072221 A1 | 3/2010 | Chirnomas |
| 2010/0100460 A1 | 4/2010 | Aronson |
| 2010/0106291 A1 | 4/2010 | Campbell et al. |
| 2010/0106588 A1 | 4/2010 | Jones et al. |
| 2010/0106662 A1 | 4/2010 | Ramaswamy |
| 2010/0108624 A1 | 5/2010 | Sparkowski |
| 2010/0133214 A1 | 6/2010 | Evans |
| 2010/0138304 A1 | 6/2010 | Boyarsky et al. |
| 2010/0169189 A1 | 7/2010 | Allison et al. |
| 2010/0169190 A1 | 7/2010 | Allison et al. |
| 2010/0175438 A1 | 7/2010 | Sankey |
| 2010/0176075 A1 | 7/2010 | Nagel et al. |
| 2010/0200526 A1 | 8/2010 | Barkdoll |
| 2010/0205045 A1 | 8/2010 | Zhang et al. |
| 2010/0206829 A1 | 8/2010 | Clements et al. |
| 2010/0258513 A1 | 10/2010 | Meyer et al. |
| 2010/0262554 A1 | 10/2010 | Elliott |
| 2010/0276383 A1 | 11/2010 | Hardy |
| 2011/0010271 A1 | 1/2011 | Black et al. |
| 2011/0015781 A1 | 1/2011 | Vardaro |
| 2011/0017532 A1 | 1/2011 | Langford et al. |
| 2011/0018685 A1 | 1/2011 | Tanaka et al. |
| 2011/0022980 A1 | 1/2011 | Segal et al. |
| 2011/0106624 A1 | 5/2011 | Bonner et al. |
| 2011/0106653 A1 | 5/2011 | Wein |
| 2011/0128378 A1 | 6/2011 | Raji |
| 2011/0161146 A1 | 6/2011 | Walker et al. |
| 2011/0178863 A1 | 7/2011 | Daigle |
| 2011/0215060 A1 | 9/2011 | Niederhuefner |
| 2011/0218889 A1 | 9/2011 | Westberg et al. |
| 2011/0234514 A1 | 9/2011 | Gothard |
| 2011/0251920 A1 | 10/2011 | Watson |
| 2011/0304316 A1 | 12/2011 | Hachmann et al. |
| 2012/0004769 A1 | 1/2012 | Hallenbeck et al. |
| 2012/0044056 A1* | 2/2012 | Byun ............... G06Q 30/0641 |
| | | 340/10.1 |
| 2012/0120327 A1 | 5/2012 | Marx et al. |
| 2012/0147055 A1 | 6/2012 | Pallakoff et al. |
| 2012/0204458 A1 | 8/2012 | Goehring |
| 2012/0223943 A1 | 9/2012 | Williams et al. |
| 2012/0228240 A1 | 9/2012 | Gentile et al. |
| 2012/0245969 A1 | 9/2012 | Campbell |
| 2012/0246023 A1 | 9/2012 | Starr |
| 2012/0273442 A1 | 11/2012 | Hardy |
| 2012/0280810 A1 | 11/2012 | Wheeler |
| 2012/0284085 A1 | 11/2012 | Walker et al. |
| 2012/0284132 A1 | 11/2012 | Kim et al. |
| 2012/0286937 A1 | 11/2012 | Cote et al. |
| 2012/0330781 A1 | 12/2012 | Borrero |
| 2013/0002422 A1 | 1/2013 | Wiese et al. |
| 2013/0024023 A1 | 1/2013 | Siegel et al. |
| 2013/0030953 A1 | 1/2013 | Marsic |
| 2013/0037562 A1 | 2/2013 | Close |
| 2013/0041752 A1 | 2/2013 | Crum |
| 2013/0109323 A1 | 5/2013 | Ruutu et al. |
| 2013/0132216 A1 | 5/2013 | Aihara et al. |
| 2013/0157569 A1 | 6/2013 | Torvmark et al. |
| 2013/0210360 A1 | 8/2013 | Ljung et al. |
| 2013/0214909 A1 | 8/2013 | Meijers et al. |
| 2013/0226742 A1 | 8/2013 | Johnson et al. |
| 2013/0235206 A1 | 9/2013 | Smith et al. |
| 2013/0275261 A1 | 10/2013 | Yoked |
| 2013/0317903 A1 | 11/2013 | Majrani |
| 2013/0332271 A1 | 12/2013 | Hay |
| 2014/0006225 A1 | 1/2014 | Bowman et al. |
| 2014/0006229 A1 | 1/2014 | Birch et al. |
| 2014/0043162 A1 | 2/2014 | Siciliano et al. |
| 2014/0055243 A1 | 2/2014 | Kerai |
| 2014/0061218 A1 | 3/2014 | Vogler et al. |
| 2014/0100769 A1 | 4/2014 | Wurman et al. |
| 2014/0100999 A1 | 4/2014 | Mountz et al. |
| 2014/0110584 A1 | 4/2014 | Campbell |
| 2014/0113560 A1 | 4/2014 | Graube et al. |
| 2014/0139548 A1 | 5/2014 | Byers |
| 2014/0145828 A1 | 5/2014 | Bassan-Eskenazi et al. |
| 2014/0167962 A1 | 6/2014 | Valiulis et al. |
| 2014/0197953 A1 | 7/2014 | Valiulis et al. |
| 2014/0201042 A1 | 7/2014 | Meyer |
| 2014/0210692 A1 | 7/2014 | Waters et al. |
| 2014/0214195 A1 | 7/2014 | Worsley |
| 2014/0220883 A1 | 8/2014 | Emigh et al. |
| 2014/0239061 A1 | 8/2014 | Smith et al. |
| 2014/0247116 A1 | 9/2014 | Davidson |
| 2014/0258028 A1 | 9/2014 | Bynum et al. |
| 2014/0268949 A1 | 9/2014 | Kayser |
| 2014/0274175 A1 | 9/2014 | Rosenblatt |
| 2014/0291405 A1 | 10/2014 | Harkes |
| 2014/0299620 A1 | 10/2014 | Swafford, Jr. et al. |
| 2014/0299663 A1 | 10/2014 | Shah et al. |
| 2014/0305891 A1 | 10/2014 | Vogler et al. |
| 2014/0316916 A1 | 10/2014 | Hay |
| 2014/0352372 A1 | 12/2014 | Grant et al. |
| 2014/0360953 A1 | 12/2014 | Pichel |
| 2015/0039477 A1 | 2/2015 | O'Neil |
| 2015/0088306 A1 | 3/2015 | Varrasso |
| 2015/0090675 A1 | 4/2015 | Vosshernrich |
| 2015/0091729 A1 | 4/2015 | Phillips et al. |
| 2015/0112827 A1 | 4/2015 | Davis et al. |
| 2015/0146018 A1 | 5/2015 | Kayser et al. |
| 2015/0186982 A1 | 7/2015 | Higgins et al. |
| 2015/0356657 A1 | 12/2015 | Pas |
| 2015/0356666 A1 | 12/2015 | Pas et al. |
| 2015/0382150 A1 | 12/2015 | Ansermet et al. |
| 2016/0048798 A1 | 2/2016 | Meyer et al. |
| 2016/0132822 A1 | 5/2016 | Swafford |
| 2016/0132823 A1 | 5/2016 | Swafford et al. |
| 2016/0132949 A1 | 5/2016 | Adoni et al. |
| 2017/0024756 A1 | 1/2017 | Hulth |
| 2017/0061525 A1 | 3/2017 | McCoy et al. |
| 2018/0078055 A1 | 3/2018 | Dipaolo et al. |
| 2020/0060435 A1 | 2/2020 | Everett et al. |
| 2022/0051310 A1* | 2/2022 | Graube ............... G06Q 30/0633 |

FOREIGN PATENT DOCUMENTS

| | | |
|---|---|---|
| BE | 1008382 A3 | 4/1996 |
| CA | 2620039 A1 | 3/2007 |
| CA | 2822926 A1 | 2/2014 |
| CH | 223095 A | 8/1942 |
| CH | 412251 A | 4/1966 |
| CN | 1787003 A | 6/2006 |
| CN | 1972228 A | 5/2007 |
| CN | 101208718 A | 6/2008 |
| CN | 101223516 A | 7/2008 |
| CN | 101248449 A | 8/2008 |
| CN | 101472509 A | 7/2009 |
| CN | 101507380 A | 8/2009 |
| CN | 101957904 A | 1/2011 |
| CN | 103703476 A | 4/2014 |
| CN | 107105905 A | 8/2017 |
| DE | 969003 C | 4/1958 |
| DE | 1819158 U | 10/1960 |
| DE | 2002720 A1 | 7/1971 |
| DE | 7311113 U | 8/1973 |
| DE | 2232398 A1 | 1/1974 |
| DE | 2825724 A1 | 12/1979 |
| DE | 3116145 A1 | 11/1982 |
| DE | 8308485 U1 | 9/1983 |
| DE | 3211880 A1 | 10/1983 |
| DE | 8426651 U1 | 2/1985 |
| DE | 8520125 U1 | 1/1986 |
| DE | 3628609 A1 | 2/1988 |
| DE | 4307082 A1 | 9/1994 |
| DE | 19745813 A1 | 4/1999 |
| DE | 299026888 | 7/1999 |
| DE | 102004037365 A1 | 3/2006 |
| EP | 0004921 A1 | 10/1979 |
| EP | 0018003 A2 | 10/1980 |

(56) References Cited

FOREIGN PATENT DOCUMENTS

| | | |
|---|---|---|
| EP | 0048479 A1 | 3/1982 |
| EP | 0176209 A2 | 4/1986 |
| EP | 0224107 A2 | 6/1987 |
| EP | 270016 A2 | 6/1988 |
| EP | 298500 A2 | 1/1989 |
| EP | 0337340 A2 | 10/1989 |
| EP | 0408400 A1 | 1/1991 |
| EP | 0454586 A1 | 10/1991 |
| EP | 0572119 A2 | 12/1993 |
| EP | 0587059 A2 | 3/1994 |
| EP | 0806749 A1 | 11/1997 |
| EP | 986980 A1 | 3/2000 |
| EP | 0779047 B1 | 4/2000 |
| EP | 1057164 A1 | 12/2000 |
| EP | 1249804 A2 | 10/2002 |
| EP | 1356425 A1 | 10/2003 |
| EP | 1395152 A1 | 3/2004 |
| EP | 1973034 A2 | 9/2008 |
| EP | 2309377 A1 | 4/2011 |
| EP | 2367101 A1 | 9/2011 |
| FR | 2385365 A1 | 10/1978 |
| FR | 2526338 A1 | 11/1983 |
| FR | 2617385 A1 | 1/1989 |
| FR | 2859364 A1 | 3/2005 |
| GB | 697994 A | 10/1953 |
| GB | 740311 A | 11/1955 |
| GB | 881700 A | 11/1961 |
| GB | 1082150 A | 9/1967 |
| GB | 1088654 A | 10/1967 |
| GB | 2027339 B | 8/1982 |
| GB | 2180527 A | 4/1987 |
| GB | 2 232 398 A | 12/1990 |
| GB | D2037553 | 7/1994 |
| GB | 2281289 A | 3/1995 |
| GB | 2290077 A | 12/1995 |
| GB | 2297241 A | 7/1996 |
| GB | 2283407 B | 10/1997 |
| GB | 2392667 A | 3/2004 |
| GB | 2480462 A | 11/2011 |
| JP | 54168195 | 11/1979 |
| JP | 59218113 | 8/1984 |
| JP | 62060521 A | 3/1987 |
| JP | 6329463 | 2/1988 |
| JP | 6056224 | 3/1994 |
| JP | 6209945 | 7/1994 |
| JP | 7257714 | 9/1994 |
| JP | H07-017608 A | 1/1995 |
| JP | H11342054 A | 12/1999 |
| JP | 2007525393 A | 9/2007 |
| JP | 2007-284238 A | 11/2007 |
| JP | 2012-058854 A | 3/2012 |
| JP | 2012-089140 A | 5/2012 |
| KP | 10-2005-0066397 | 6/2005 |
| KR | 1020040089123 A | 10/2004 |
| KR | 10-2005-0066397 | 6/2005 |
| KR | 1020060123497 | 6/2008 |
| KR | 1020090054501 | 12/2010 |
| KR | 1020100022890 | 8/2011 |
| KR | 1020100041969 | 11/2011 |
| KR | 10-2014-0074824 A | 6/2014 |
| KR | 101507380 B1 | 4/2015 |
| NL | 106617 A | 11/1963 |
| RU | 2101731 C1 | 1/1998 |
| SE | 394537 B | 6/1977 |
| SU | 1600615 A3 | 10/1990 |
| WO | 91/15141 A1 | 10/1991 |
| WO | 9311449 A1 | 6/1993 |
| WO | 9919849 A1 | 4/1999 |
| WO | 0061438 A1 | 10/2000 |
| WO | 0071004 A1 | 11/2000 |
| WO | 02/091885 A1 | 11/2002 |
| WO | 03016938 A2 | 2/2003 |
| WO | 2003032775 | 4/2003 |
| WO | 03039301 A1 | 5/2003 |
| WO | 03072471 A1 | 9/2003 |
| WO | 2004104951 A1 | 12/2004 |
| WO | 2005033645 A1 | 4/2005 |
| WO | 2005057444 A1 | 6/2005 |
| WO | 2006023954 A2 | 3/2006 |
| WO | 06133487 A1 | 12/2006 |
| WO | 2007024639 A2 | 3/2007 |
| WO | 2007073334 A1 | 6/2007 |
| WO | 07140800 A1 | 12/2007 |
| WO | 2007149967 A2 | 12/2007 |
| WO | 10082835 A1 | 7/2010 |
| WO | 2010094778 A1 | 8/2010 |
| WO | 10137883 A2 | 12/2010 |
| WO | 11001024 | 1/2011 |
| WO | 2011089452 A1 | 7/2011 |
| WO | 2012166613 A1 | 12/2012 |
| WO | 14080252 A1 | 5/2014 |
| WO | 2014/144631 A2 | 9/2014 |

OTHER PUBLICATIONS

Shelf-edge digital price tags invade the South of France http://www.digitalsignagetoday.com/article/196299/Shelf-edge-digital-price-tags-invade-the-South-of-France.
eSignage http://www.episys.com/page/25/esignage.htm.
Electronic Shelf-Edge Labels ("Realprice system") http://www.hitech-lcd.com/ESL.html.
Segmented Dot Matrix Electronic Shelf Label â€" SM Model' and 'Segmented Dot Matrix Electronic Narrow Facing Label â€" MM http://www.ilid.com.au/product-range.php#sm.
Electronic Shelf-Edge Labels http://www.fujitsu.com/downloads/EU/uk/pdf/industries/retail/retail-solutions-electronic-self-edge-labels.pdf.
The NZ ESL range from pricer http://www.electronicshelflabelling.co.nz/products/.
Retailer introduces electronic shelf-edge labelling http://www.conveniencestore.co.uk/news/retailer-introduces-electronic-shelf-edge-labelling/231511.article.
Revolutionary Shelf Edge Displays from in the UK http://crystal-display.com/digital-signage/shelf-edge-displays/.
XDS-1068: 10-inch All-in-One Multi-touch Signboard with Power-over-Ethernet http://www.iadea.com/product/xds-1068.
ZBD Solutions, Shelf Edge Labelling http://www.zbdsolutions.com/solutions/index.html (printed Jan. 29, 2013).
Vectron, Speedy POS Solutions to make ezi-profits. 15 pages.
"How physics drives the supermarket industry," IOP Institute of Physics, Physicsworks. 4 pages.
John Ross, "Retail technology and the evolving shopper," Shopper Sciences. 11 pages.
Altierre Digital Retail, Altierre Corp., "Altierre Unveils E-Paper Product Family for Digital Signs and Price Tags." 2 pages, http://www.altierre.com/pr_e-paper.html (printed Jan. 31, 2013).
Apr. 2, 2014—(RU)—Office Action—App 2013109955.
FFr Yello Pages 02003 Product Catalog, "Merchandising Ideas Made Easy for Every Retail Environment!", Cover pg., 9-11, 48-49, 52-58, Back Cover.
Letter from Maria Comninou of Harness Dickey to Stephanie Knapp dated Nov. 11, 2009.
Document entitled "Relevant Prior Art for U.S. Appl. No. 10/772,010".
Suzanne Vita Palazzo, "New life for ESLs?, Advanced capabilities being buill into electronic shelf labels may help overcome retailers' concerns about ROI.", Grocery Headquarters (www.groceryheadquarters.com), Mar. 2007, pp. 97-100.
Scott D. Walkins & Megan E. Henriksen of Anderson Economic Group, LLC, "Michigan's Item Pricing Law: The Price Tag for Retailers and Consumers," Dec. 11, 2010 (http://www.AndersonElectronicGroup.com) 39 pages.
"Product Range :: I LID—The next generation in electronic shelf labels," : http://www.ilid.com.au/product-range.php, printed on Mar. 5, 2013, dale of website unknown but prior to the filing of the present matter.
"Electronic Shelf Label controlling various information in real lime (ESL)," hllp:l/cesl.co.kr/eng/product-introduction/cest-esl.hlml, CEST—

(56) References Cited

OTHER PUBLICATIONS

Center for Embedded Software Technology, printed on Mar. 5, 2013, dale of website unknown out prior to the filing of the present matter.
Jun. 24, 2014—(MX)—Office Action—App MX/a/2013/001455—Eng Tran.
Mar. 3, 2015—(AU) Office Action—App 2011285929.
Mar. 3, 2015—(AU) Office Action—App 2013205058.
Apr. 6, 2015—(PCT) International Search Report—App PCT/US14/29124.
Dec. 14, 2015—(EP) Exam Report—App 11745636.8.
Apr. 19, 2016—(KR) Office Action—App 10-2015-7027591.
Apr. 22, 2016—(PCT)—International Search Report—App PCT/US2015/060404.
Apr. 22, 2016 (PCT) ISR and Written Opinion—App PCT/US2015/060404.
Jun. 22, 2016—(AU) Search Report—App 2014225837.
Jun. 28, 2016—(AU) Examination Report—App 2014228923.
Aug. 18, 2016—(EP) Office Action—App 14716461.0.
Jun. 10, 2014—(PCT) ISR & Written Opinion—App PCT/US2014/020797.
Sep. 19, 2016—(PCT) International Search Report—App PCT/US2016/032328.
Robertson, "Food Packaging: Principles and Practice, Second Edition", CRC Press, XP055301114, ISBN: 978-0-8493-3775-8, vol. 0, p. 308, dated Sep. 22, 2005.
George Coulouris et al., "Distributed Systems: Concepts and Design (5th Edition)", Addison-Wesley, US, XP055261658, ISBN: 978-0-13-214301-1 pp. Ch01-Ch06, Ch09-Ch10, ch13,, Chapters 1, 3 and 19, dated May 7, 2011.
Oct. 27, 2016—(KR) Final Rejection—App 10-2015-7027591.
Dec. 14, 2015—(EP) Examination Report—U.S. Appl. No. 11/745,636.
Mar. 20, 2008—(WO) ISR and Written Opinion—App. No. PCT/US05/02836.
Jan. 28, 2011—(EP) Supplementary Search Report—App. No. 05712322.6-2221.
Dec. 6, 2011—(EP) Office Action—App. No. 05712322.6-2221.
May 25, 2011—(EP) Office Action—App. No. 05712322.6-2221.
Nov. 24, 2011—(WO) ISR and Written Opinion—App. No. PCT/US2011/046209.
Feb. 21, 2013—(WO) IPR and Written Opinion—App. No. PCT/US2011/046209.
Apr. 2, 2014—(RU) Office Action—App. No. 2013109955.
Sep. 24, 2015—(WO) IPRP and Written Opinion—App. No. PCT/US2014/29124.
Apr. 6, 2015—(WO) Written Opinion—App. No. PCT/US2014/29124.
Mar. 1, 2017—(AU) Second Office Action—App. No. 2014228923.
Aug. 19, 2016—(EP) Extended ESR—App. No. 14723571.7-1903.
Dec. 31, 2021—(CN) Office Action—App 201680041389.1.
Jan. 6, 2022—(CN) Office Action—App 201910261003.3.
Jul. 30, 2021—(AU) Examination Report—App 2019271906.
Jun. 29, 2021—(KR) Office Action w/Tr.—10-2020-7010991.
Aug. 2, 2021—(CN) Office Action—App 201680041389.1.
Nov. 12, 2021—(EP) Office Action—App 19158063.8.
Nov. 29, 2021—(EP) Office Action—App. 17177125.6.
Dec. 8, 2021—(EP) Examination Report—App 16744914.9.
Nov. 26, 2021—(AU) Second Examination Report—App 2018336797.
Apr. 6, 2015—(WO) ISR—App. No. PCT/US2014/29124.
Jun. 19, 2017—(CN) First Office Action and ISR—App. No. 201480026575.9.
Jun. 7, 2017—(CN) ISR—App. No. 201480026575.9.
Jul. 18, 2017—(KR) Office Action—App. 10-2015-7029832.
Nov. 7, 2017—(EP) Extended Search Report—App. No. 17177125.6.
Nov. 7, 2017—(EP)—Communication 94(3) EPC—App 14716461.0.
Feb. 23, 2018—(CN) Second Office Action—App. No. 201480026575.9.
Mar. 14, 2018—(EP) Communication Pursuant to Article 94(3) EPC—App 15798644.9.
Apr. 6, 2018—(KR) Office Action—App 10-2017-7015819.
Jan. 18, 2018—(AU) Examination Report—App 2015346254.
Apr. 2, 2018—(CN) First Office Action—App 201480024831.0.
May 30, 2018—(AU) Examination Report—App 2015346254.
Jul. 6, 2018—(CN) Third Office Action—App 201480026575.9.
FFrR Yellow Pages 02003 Product Catalog, "Merchandising Ideas Made Easy for Every Retail Environment!", Cover pg., 9-11, 48-49, 52-58, Back Cover.
Oct. 28, 2018—(KR) Final Rejection—App 10-2017-7015819.
Jan. 31, 2019—(CN)—Second Office Action—App 201480024831.0.
Feb. 11, 2019—(KR) Office Action—App 10-2017-736152.
Mar. 15, 2019—(EP) Extended Europen Search Report and European Search Opinion—App 19153057.5.
Jan. 10, 2019—(WO) International Search Report and Written Opinion—App. No. PCT/US2018/051775.
Apr. 22, 2019—(KR) Office Action—App. No. 10-2018-7015060.
Jun. 14, 2019—(EP) Partial European Search Report—App 19158063.8.
Jul. 5, 2019—(CN) Office Action—App. No. 201580072899.0.
Jul. 30, 2019—(EP) Examination Report—App 16744914.9.
Iddo Genuth, "The Future of Electronic Paper," Oct. 15, 2007, XP002513292, Down oaded from http://thefutureofthings.com/articles/1000/the-future-of-electornic-paper.html, 7 pages.
Aug. 28, 2019—(AU) First Examination Report—App 2018241074.
Aug. 16, 2019—(CN) Third Office Action—App 201480024831.0.
Oct. 30, 2019—(KR) NOA—App 10-2018-7015060.
Nov. 5, 2019—(AU) Second Examination Report—App 2018241074.
Nov. 15, 2019—(WO) ISR & Written Opinion—PCT/US19/051724.
Nov. 27, 2019—(KR) Office Action—App 10-2017-7036152.
Jan. 7, 2020—(CN) Rejection Decision—App 201480024831.0.
Jun. 2, 2020—(KR) Office Action—App. No. 10-2020-7002962.
Jul. 14, 2020—(EP) Office Action—App. No. 17177125.6.
Jun. 29, 2020—(CN) Third Office Action (w/translation)—App 201580072899.0.
https://smartshelf.com/retail_solutions.html#led.
https://www.youtube.com/watch?v=ULucc1ZVBnM&feature=youtu.be.
Oct. 15, 2020—(EP) Office Action—App 16744914.9.
Dec. 2, 2020—(CN) First Office Action—CN 2018800734745.
Dec. 10, 2020—(KR) Office Action—App. No. 10-2020-7002962.
Jan. 5, 2021—(AU) Examination Report—App 2019271906.
Jan. 14, 2021—(CN) Notice of Re-examination—App 201480024831.0.
Jan. 27, 2021—(EP) Office Action—EP18783266.2.
Feb. 10, 2021—(AU) First Examination Report—App 2020203256.
Jan. 28, 2021—(AU) Office Action—AU 2018336797.
Mar. 26, 2021—(EP) Second Office Action—App. No. 17177125.6.
Mar. 23, 2021—(WO) IPRP and Written Opinion—App. No. PCT/US2019/051724.
McAndrew, Sean T., et al., "Potential use of real-time data capture and job-tracking technology in the field," Facilities 2005, 23, pp. 31-46.
May 20, 2021—(KR) Office Action App. No. 10-2020-7014465.
May 20, 2021—(AU) Examination Report—App 2020203256.
Jul. 13, 2021—(CN) Reexamination Decision—App 201480024831.0.

* cited by examiner

IN-STORE ITEM ALERT ARCHITECTURE

CROSS REFERENCE TO RELATED APPLICATION

This application is a continuation application of U.S. application Ser. No. 16/540,689, filed Aug. 14, 2019, now allowed, which is a continuation of U.S. application Ser. No. of 15/808,983, filed Nov. 10, 2017, now U.S. Pat. 10,410,277, which is a continuation application of U.S. application Ser. No. 13/785,082, filed Mar. 5, 2013, now U.S. Pat. 9,818,148, which applications are incorporated fully herein by reference.

BACKGROUND

Customer retention and customer satisfaction are goals of many businesses. For businesses that focus on and rely on repeat customers, convenience for customers assists in meeting these goals. Many businesses attempt to make the process of purchase easier for a customer. Businesses have developed self-checkout systems to expedite the purchasing process. Over time grocery store type businesses have learned to put similar items in the same area for convenience to a customer. By putting all fresh fruits and vegetables in the same area and putting all refrigerated milk, yogurt, cream, and cheese in the same area, customers can purchase for one category without having to go all around a grocery store. Further improvements and innovations in the area of convenience for a customer are desired.

SUMMARY

A method and apparatus for alerting an individual is described. A determination as to whether an individual is within a sensing area of a first device is made. The first device may be configured to provide information about a product on a shelf on which the first device is attached. In response to determining that the individual is within the sensing area, a determination as to whether to notify an occurrence of the determination that the individual is within the sensing area of the first device to at least one second device is made. In response to determining to notify, a notification may be transmitted to the at least one second device that the individual is within the sensing area of the first device. An alert may be triggered at the at least one second device based upon the transmitted notification.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
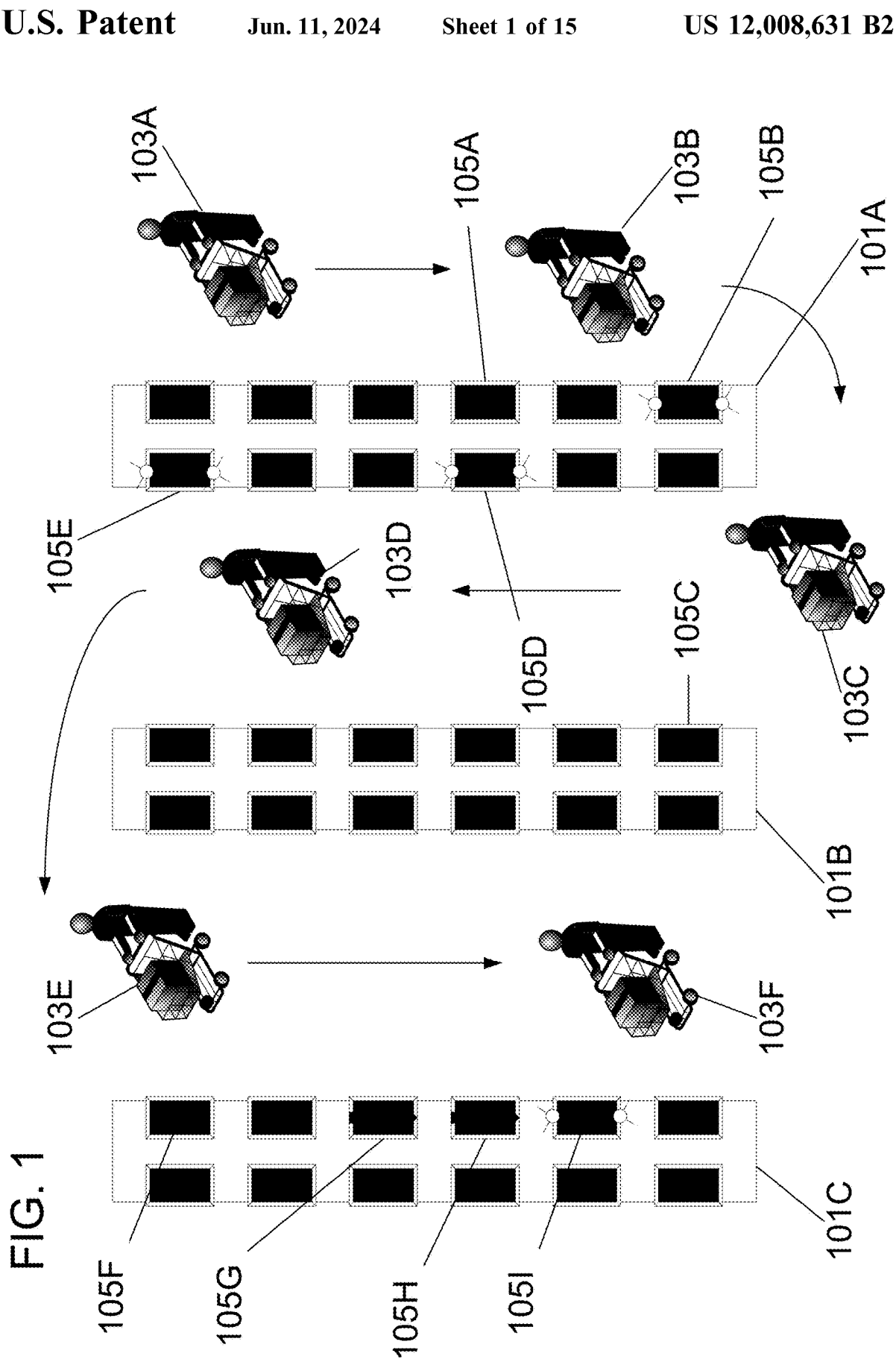
FIG. 1 illustrates an example system for distributing content to a customer in a store according to one or more illustrative aspects of the disclosure.

FIG. 1 illustrates an example system for distributing content to a customer in a store according to one or more illustrative aspects of the disclosure. The system in FIG. 1 shows an example of the customer walking through a store with aisles. In this example, as the customer walks from location 103A to location 103B, the customer passes shelf label device 105A. Shelf label device 105A, as described in more detail herein, is a networked, interactive self-edge communication and information exchange platform. Shelf label 105A provides information to a customer about an associated item/product, such as the price of the item, weight of the item, price per oz. of the item, name of the item, etc. In the example of FIG. 1, shelf label device 105A also may be configured to determine that the customer is near it. In this example, when the customer has stopped at location 103B and the shelf label device 105A has detected the presence of the customer near the shelf label device 105A, the system may determine that the customer is looking at an item associated with shelf label device 105A.

In response to such a detection/determination, shelf label device 105A may notify related shelf label devices of this occurrence. For example, shelf label device 105B which is also along aisle 101A may be notified by shelf device 105A. Shelf label device 105B may be associated with an item that is related to the item associated with shelf label device 105A. For example, the item associated with shelf label device 105A may be a toothbrush by manufacturer X and the item associated with shelf label device 105B may be toothpaste by the same manufacturer X. In the example of FIG. 1, shelf label device 105A may be related to shelf label device 105B because both shelf label devices are located along aisle 101A and may be by the same manufacturer X.

Determining that one shelf label device is related to another shelf label device may be based on any of a number of factors. For example, one shelf label device may be related to another shelf label device for marketing purposes. In such an example, a store may have a special marketing program for a particular manufacturer Y. Upon the consumer entering an aisle in which manufacturer Y has an item offered for sale, the shelf label device associated with the item of the manufacturer Y may be notified by another shelf label device. As described herein, the shelf label device associated with the item of the manufacturer Y may trigger an alert to get the customer's attention. In the example of FIG. 1, shelf label device 105B has any alert triggered of flashing lights. The flashing lights may be part of a display of the shelf label device and/or may be an LED light or some other type of light. As such, the customer may be attracted to shelf label device 105B and subsequently decide to purchase the item associated with it.

In another example, the customer may proceed to location 103C along aisle 101B. Shelf label device 105C in the aisle 101B may detect the presence of the customer. Upon determining that the customer has taken an item associated with shelf label 105C, the system may determine if any items offered for sale in the aisle 101B may be in conflict with the item associated with shelf label device 105C. For example, the item associated with shelf label device 105C may be a particular breed of fish. Fish associated with shelf label device 105D and 105E may be particular breeds of fish that cannot cohabit with the fish associated with shelf label item 105C. For example, the fish associated with shelf label device 105D and shelf label device 105E may be known to eat the fish associated with shelf label device 105C. As such, the relationship of the shelf label devices 105C, 105D, and 105E, may be a negative relationship. In such an example, the alert of shelf label devices 105D and 105E may be an alert to not purchase the item associated with shelf label devices 105D and 105E.

In another example, shelf label devices 105D and 105E may only output an alert for a predetermined period of time. If shelf label device 105D and/or 105E senses that the customer is near the shelf label item within the threshold predetermined period of time, the shelf label device may disengage its alert and subsequently return to a usual or default output display. Alternatively the shelf label device may return to the usual or default output display when a threshold period of time has been met and sensing of the presence of the customer has not occurred.

Proceeding to the example where the customer has moved to location 103E in aisle 101C, shelf label device 105F may determine that the customer is near it. Shelf label device 105F may notify related shelf label devices 105G, 105H, and 105I. In response, shelf label devices 105G, 105H, and 105I, may trigger alerts to catch the customer's attention. In this example, attention is being drawn to the item associated with shelf label device 105I, but an alert is being triggered for shelf label devices 105G and 105H to guide the customer to shelf label item 105I. In this particular example, displays associated with the shelf label devices 105G and 105H output a directional arrow that guides the customer to shelf label device 105I. In this example, the customer moves to location 103F and may decide to purchase the item associated with shelf label device 105I.

Figure 2:
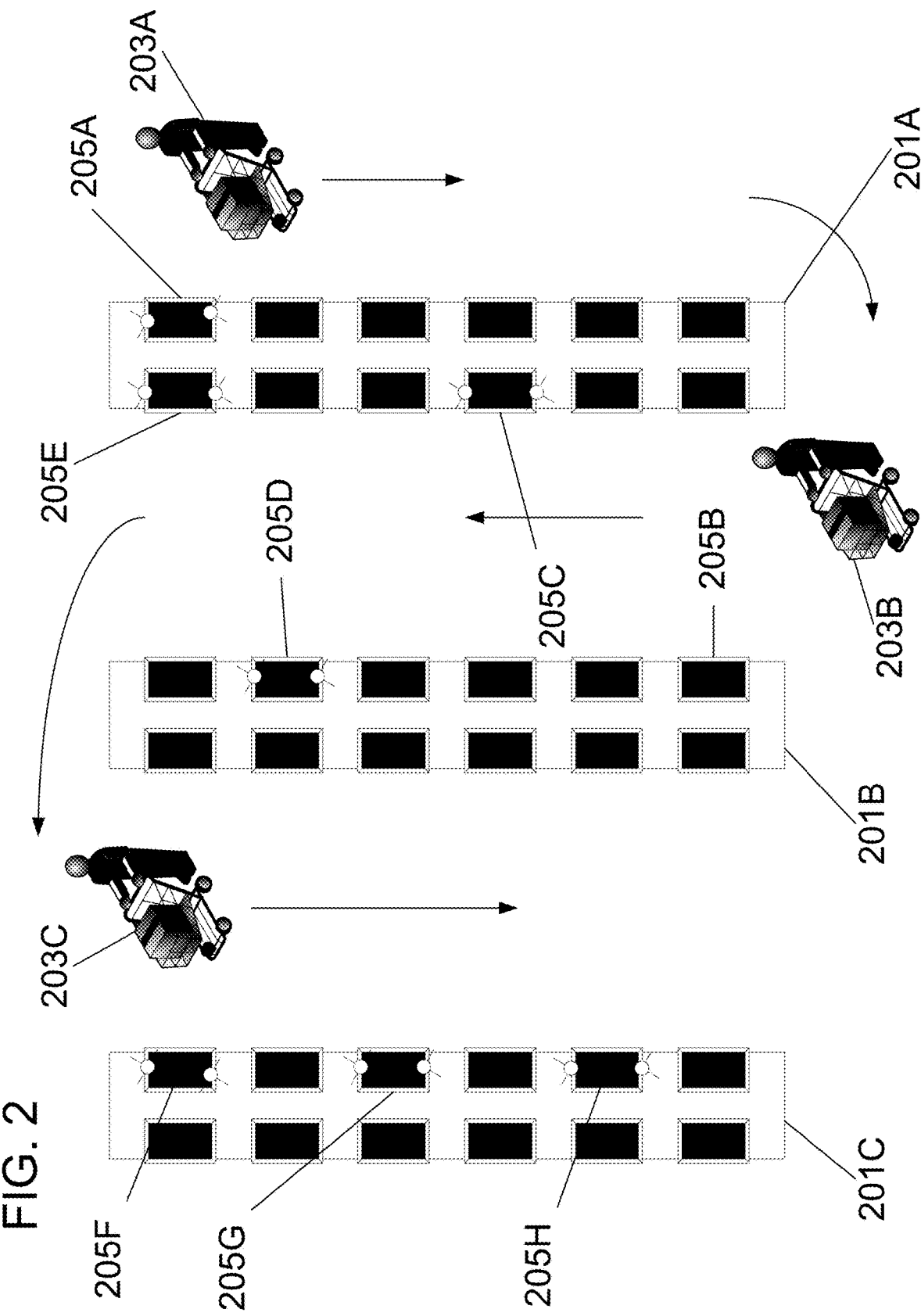
FIG. 2 illustrates another example system for distributing content to a customer in a store according to one or more illustrative aspects of the disclosure.

FIG. 2 illustrates another example system for distributing content to a customer in a store according to one or more illustrative aspects of the disclosure. The system in FIG. 2 shows another example of a customer walking through a store with aisles. In this example, the customer may have a list of items to purchase, such as an electronic grocery store shopping list. Such an electronic grocery store shopping list may be maintained on a mobile device, such as a portable phone, of the customer and/or may be maintained in a server associated with the store itself. For example, the customer may keep an online grocery list associated with the store. The customer may update the list as needed at home or on a mobile device. Then the customer may access the store in the example of FIG. 2.

As a customer enters a store and the first aisle 201A, the customer may begin at location 203A. In response, a shelf label device 205A may detect the presence of the customer in aisle 201A. Shelf label device 205A may access a customer list of the customer. Shelf label device 205A may access an electronic grocery store shopping list of the customer that is maintained in the customer's smart phone. Such an electronic grocery store shopping list may be part of a software application of the store available on the smartphone of the customer. Having accessed the list, shelf label device 205A may determine if the item associated with it is on the customer's list and may determine if any items associated with the customer's list are on aisle 201A. In this example, there are no items in the aisle 201A other than the item associated with shelf label device 205A. As such, the customer may select the item associated with the shelf label device 205A and may proceed to location 203B.

At location 203B, shelf label device 205B in aisle 201B may determine that the customer is within its sensing area and access the customer list from the customer's smart phone. Shelf label device 205B may determine that the item it is associated with is not on the customer's list; however, shelf label device 205B may determine the items associated with the shelf label devices 205C, 205D and 205E are on the customer's list. In response, shelf label device 205B may notify shelf label devices 205C, 205D, and 205E that the items associated with them are on the customer's list. In response, shelf label devices 205C, 205D, and 205E may trigger an alert to attract the customer to its associated item. Such a system may allow for a customer that has no familiarity with a store to quickly obtain all items on the customer's grocery list. As similarly described in FIG. 1, one or more of the alerts of shelf label devices 205C, 205D, and 205E may be an alert to the customer to not purchase its associated item.

Similarly, as the customer proceeds to location 203C in aisle 201C, shelf label device 205F may sense the presence of the customer, determine that the item associated with its use on the customer's list, and notify shelf label devices 205G and 205H that the items associated with them are also on the customer's list. In this example, shelf label device 205F may access the grocery list of the customer directly from the customer smartphone just as shelf label device 205A did. Alternatively, shelf label device 205F may have been notified by another shelf label device, such as shelf label device 205A, that the item associated with shelf label device 205F is on the customer's list. Only after detecting that the customer is close to shelf label device 205F may shelf label 205F trigger an alert to the customer. For example, in a store that has 20 aisles, a shelf label device on the aisle 19 may not trigger an alert for the customer until knowing that the customer is on the aisle 19.

In yet another example, the customer list may be determined prior to a customer coming within a sensing range of a shelf label device. For example, as the customer enters the store, the store may identify the customer, such as through access of the customer smartphone and/or some other manner, e.g. biometrically. Upon identification of the customer, the store may access the customer's list. For example the customer may have an online account with the store for maintaining a list of items for purchase at the store. Such an online account and list may be maintained in a server and database associated with the store. The server may notify all shelf label devices associated with items on the customer's list that the customer is in the store and to be prepared to trigger an alert when the customer is within sensing range of the shelf label device.

Figure 3A:
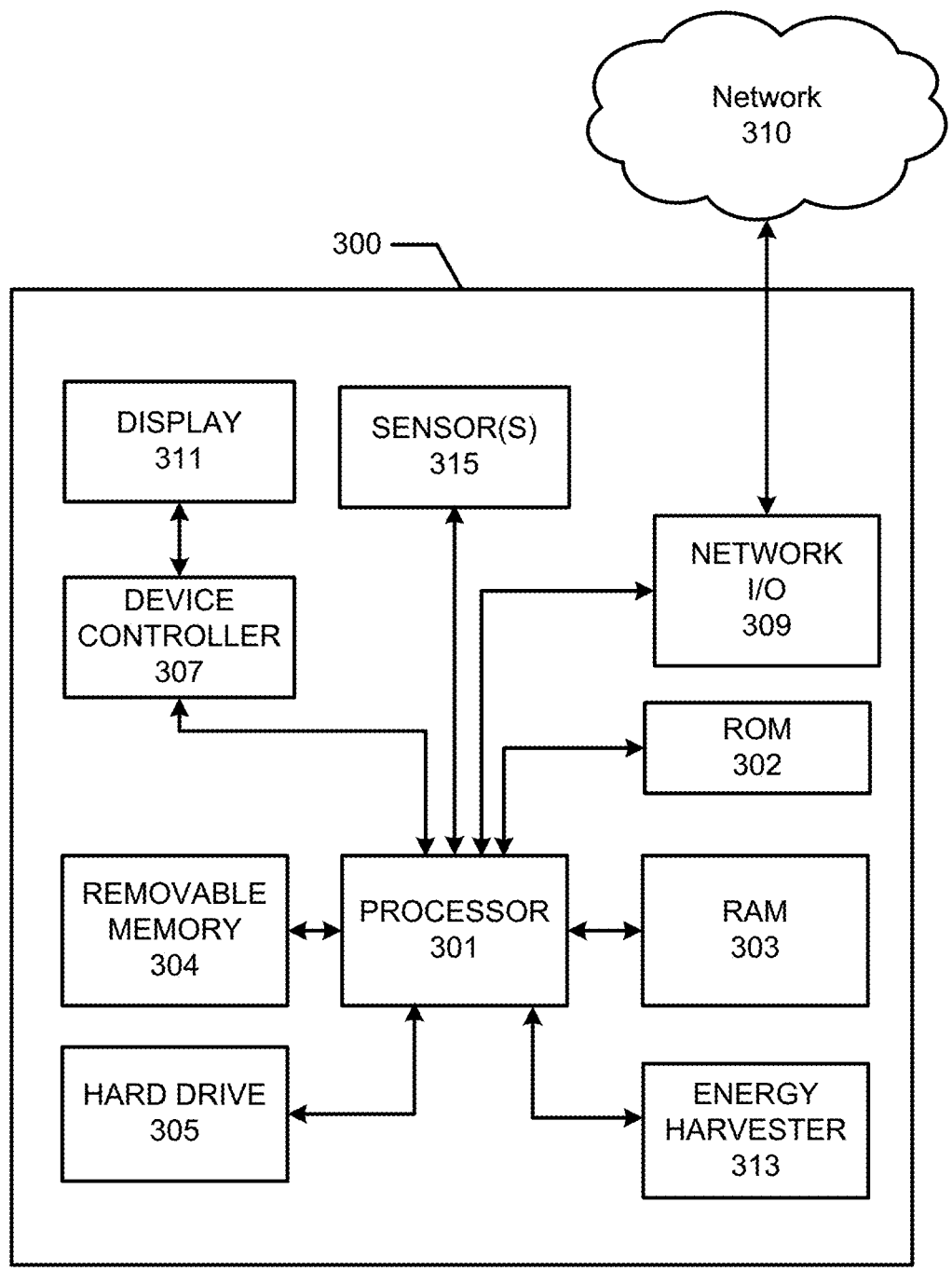
FIG. 3A illustrates an example block diagram of an apparatus for communicating and distributing content according to one or more illustrative aspects of the disclosure.

FIG. 3A illustrates an example block diagram of an apparatus for communicating and distributing content according to one or more illustrative aspects of the disclosure. Network 310 may include networks of one or more access points, Internet devices, telephone networks, cellular telephone networks, fiber optic networks, local wireless networks (e.g., WiMAX), satellite networks, and any other desired network. The network 310 may include and/or function as a cloud computing infrastructure comprising various processing and/or memory devices (e.g., servers, databases, application providers, etc.).

The various devices described herein, such as a shelf label device and a server, may be computing devices, and FIG. 3A illustrates general hardware elements that can be used to implement any of the various computing devices discussed herein. The computing device 300 may include one or more processors 301, which may execute instructions of a computer program to perform any of the features described herein. Processor 301 may comprise a customized digital integrated circuit such as an ASIC. However, in some applications, commercially available processors may be employed. The instructions may be stored in any type of non-transitory computer-readable medium or memory, to configure the operation of the processor 301. For example, instructions may be stored in a read-only memory (ROM) 302, random access memory (RAM) 303, hard drive 305, removable media 304, such as a Universal Serial Bus (USB) drive, compact disk (CD) or digital versatile disk (DVD), floppy disk drive, or any other desired electronic storage medium. Instructions may also be stored in an attached (or internal) hard drive 305. One or more of the memories 302, 303, 304, and/or 305 may include a more advanced operation environment such as an operating system for advanced functionality and adaptability. One or more memories 302, 303, 304, and/or 305 may include a stored address location and a display data location. Address location may include an address that identifies the computing device 300. The address may uniquely identify the computing device 300. Display data memory may be used by processor 301 to format data to be displayed on display 311. This may include text data, graphics, dynamic content, and combinations. In accordance with at least one embodiment, the display data in a memory may is in accordance with a mark-up language such as HTML, XML, or the like.

The computing device 300 may include one or more output devices, such as a display 311 (or an external display), and may include one or more output device controllers 307, such as a video processor. There may also be one or more user input devices (not shown), such as a remote control, keyboard, mouse, touch screen, microphone, etc. In another embodiment, input/output functions with a user may occur through display 311 where display 311 may be configured to allow for touch screen input in order to see additional output on the display 311. The computing device 300 may also include one or more network interfaces, such as input/output circuits 309 (such as a network interface circuit) to communicate with an external network 310. The network interface 309 may be a wired interface, wireless interface, or a combination of the two. The network interface 309 allows for communication between two computing devices, such as two shelf label devices, e.g., 105D and 105E in FIG. 1, and/or a shelf label device and a server (e.g., 405A and 401 in FIG. 4 described below).

Computing device 300 also may include an energy harvester component 313. Energy harvester component 313 allows for the computing device to operate the processor 301 and various other components without the need for a dedicated battery source or external power source, such as an AC source connection. Energy harvester 313 may be configured to operate by harvesting energy for operation from ambient light in a store where the computing device is located. Light energy may be captured by a variety of means for conversion, such as by photo sensors, solar photovoltaic panels, and photo diodes. Because the computing device 300 may operate without an external source connection, movement of the computing device from one physical location to another physical location can be accomplished without the need to reconnect to another external source. Further, because the computing device 300 may operate without an internal battery, the computing device does not need to be checked to ensure operation nor need to have a technician replace the internal battery.

Computing device 300 also is shown to include one or more sensors 315. Sensor(s) 315 may include one or more of a variety of different sensing mechanisms. Sensor 315 may include a motion detection element in order to detect the presence of an object, such as a customer, in a viewing range of the sensor. Such a motion detection element may be configured to signal the processor upon occurrence of the motion detection element detecting an object within its range of viewing. Sensor 315 may be configured to include a threshold for detecting the presence of a customer for a period of time as opposed to just walking past the sensor 315. If the customer is detected to remain within the viewing range of the sensor 315 past the threshold time period, the sensor 315 then may signal the processor 301 of a triggering event. From there, as described herein, the processor may execute instructions for changing the display and/or changing an alert status. Sensor 315 may be of another type, such as a temperature sensor to detect a change in temperature within the sensing area. Such a change in temperature may be identified as the presence of a customer. In still other variations, sensor 315 may include a light change sensor for detecting a change in light within the viewing area of the sensor. Again such a light change may indicate the presence of a customer.

Figure 3B:
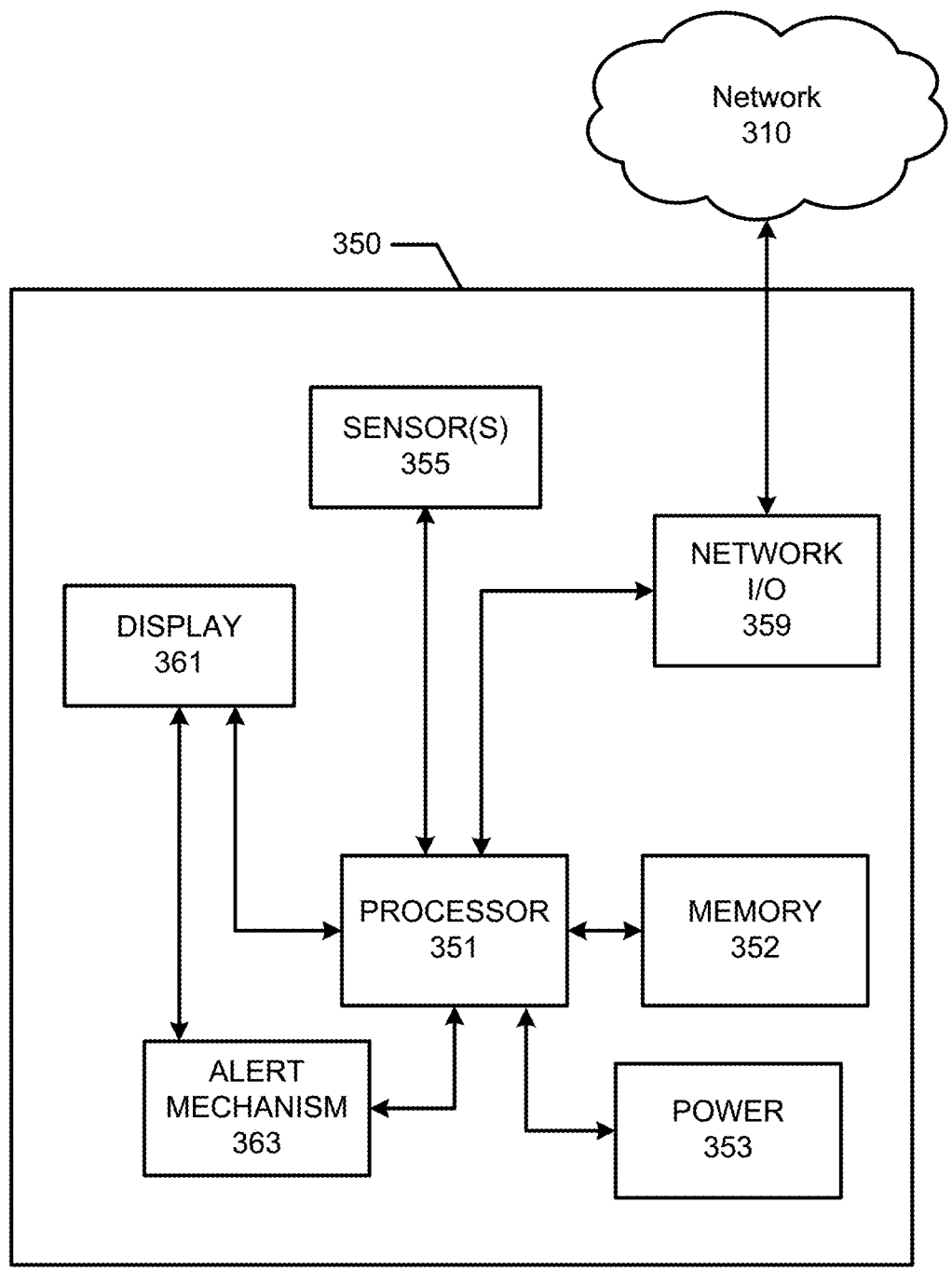
FIG. 3B illustrates an example block diagram of an apparatus for communicating and distributing content according to one or more illustrative aspects of the disclosure.

FIG. 3B illustrates an example block diagram of an apparatus for communicating and distributing content according to one or more illustrative aspects of the disclosure. In the example of FIG. 3B, an electronic shelf label device 350 is shown operatively connected to a network 310. As described with respect to FIG. 3A, Network 310 may include networks of one or more access points, Internet devices, telephone networks, cellular telephone networks, fiber optic networks, local wireless networks (e.g., WiMAX), satellite networks, and any other desired network. The network 310 may include and/or function as a cloud computing infrastructure comprising various processing and/or memory devices (e.g., servers, databases, application providers, etc.).

Electronic shelf label device 350 may include one or more processors 351, which may execute instructions of a computer program to perform any of the features described herein. Processor 351 may comprise a customized digital integrated circuit such as an ASIC. However, in some applications, commercially available processors may be employed. The instructions may be stored in any type of non-transitory computer-readable medium or memory 352, to configure the operation of the processor 351. For example, instructions may be stored in a read-only memory (ROM), random access memory (RAM), hard drive, removable media, such as a Universal Serial Bus (USB) drive, compact disk (CD) or digital versatile disk (DVD), floppy disk drive, and/or any other desired electronic storage medium. Instructions may also be stored in an attached (or internal) hard drive. Memory 352 may include a more advanced operation environment such as an operating system for advanced functionality and adaptability. Memory 352 may include a stored address location and a display data location. Address location may include an address that identifies the electronic shelf label device 350. The address may uniquely identify the electronic shelf label device 350. Display data memory may be used by processor 351 to format data to be displayed on display 361. This may include text data, graphics, dynamic content, and combinations. In accordance with at least one embodiment, the display data in a memory may is in accordance with a mark-up language such as HTML, XML, or the like.

The electronic shelf label device 350 may include one or more output devices, such as a display 361 (or an external display), and may include one or more output device controllers (not shown), such as a video processor. There may also be one or more user input devices (not shown), such as a remote control, keyboard, mouse, touch screen, microphone, etc. In another embodiment, input/output functions with a user may occur through display 361 where display 361 may be configured to allow for touch screen input in order to see additional output on the display 361. The electronic shelf label device 350 may also include one or more network interfaces, such as input/output circuits (such as a network interface circuit not shown) to communicate with an external network 310. The network interface may be a wired interface, wireless interface, or a combination of the two. The network interface allows for communication between two electronic shelf label devices, such as shelf label devices, 105D and 105E in FIG. 1, and/or a shelf label device and a server (e.g., 405A and 401 in FIG. 4 described below).

Electronic shelf label device 350 also may include a power supply 353. Power supply 353 may be configured to allow for the electronic shelf label device 350 to operate the processor 351 and various other components without the need for a dedicated battery source or external power source, such as an AC source connection. Power supply 353 may be configured to operate by harvesting energy for operation from ambient light in a store where the electronic shelf label device 350 is located. Light energy may be captured by a variety of means for conversion, such as by photo sensors, solar photovoltaic panels, and photo diodes. Because the electronic shelf label device 350 may operate without an external source connection, movement of the electronic shelf label device 350 from one physical location to another physical location can be accomplished without the need to reconnect to another external source. Further, because the electronic shelf label device 350 may operate without an internal battery, the electronic shelf label device 350 does not need to be checked to ensure operation nor need to have a technician replace the internal battery.

Electronic shelf label device 350 also is shown to include one or more sensors 355. Sensor(s) 355 may include one or more of a variety of different sensing mechanisms. Sensor 355 may include a motion detection element in order to detect the presence of an object, such as a customer, in a viewing range of the sensor. Such a motion detection element may be configured to signal the processor 351 upon occurrence of the motion detection element detecting an object within its range of viewing. Sensor 355 may be configured to include a threshold for detecting the presence of a customer for a period of time as opposed to just walking past the sensor 355. If the customer is detected to remain within the viewing range of the sensor 355 past the threshold time period, the sensor 355 then may signal the processor 351 of a triggering event. From there, as described herein, the processor 351 may execute instructions for changing the display 361 and/or changing an alert status. Sensor 355 may be of another type, such as a temperature sensor to detect a change in temperature within the sensing area. Such a change in temperature may be identified as the presence of a customer. In still other variations, sensor 355 may include a light change sensor for detecting a change in light within the viewing area of the sensor. Again such a light change may indicate the presence of a customer.

Electronic shelf label device 350 also is shown to include one or more alert mechanisms 363. Alert mechanism(s) 363 may include one or more of a variety of different alert mechanisms. Alert mechanism(s) 363 may be an audio and/or visual alert mechanism for gaining the attention of a customer. Alert mechanism 363 may be triggered upon determining that sensor(s) 355 have determined the presence of a customer in a field of view of the electronic shelf label device 350. Upon sensing the presence of the customer, sensor 355 may provide an input to processor 351 of the occurrence and processor 351 may trigger the alert mechanism 363 to engage an alert. Such an alert may include an audio alert, a video alert triggered through display 361 in which alert mechanism 3623 may be operatively connected, and/or a visual alert, such as a flashing and/or blinking light. As should be understood, one or more of the components on electronic shelf label device 350 may be included within one integrated circuit and may all be included within one physical housing.

Figure 4:
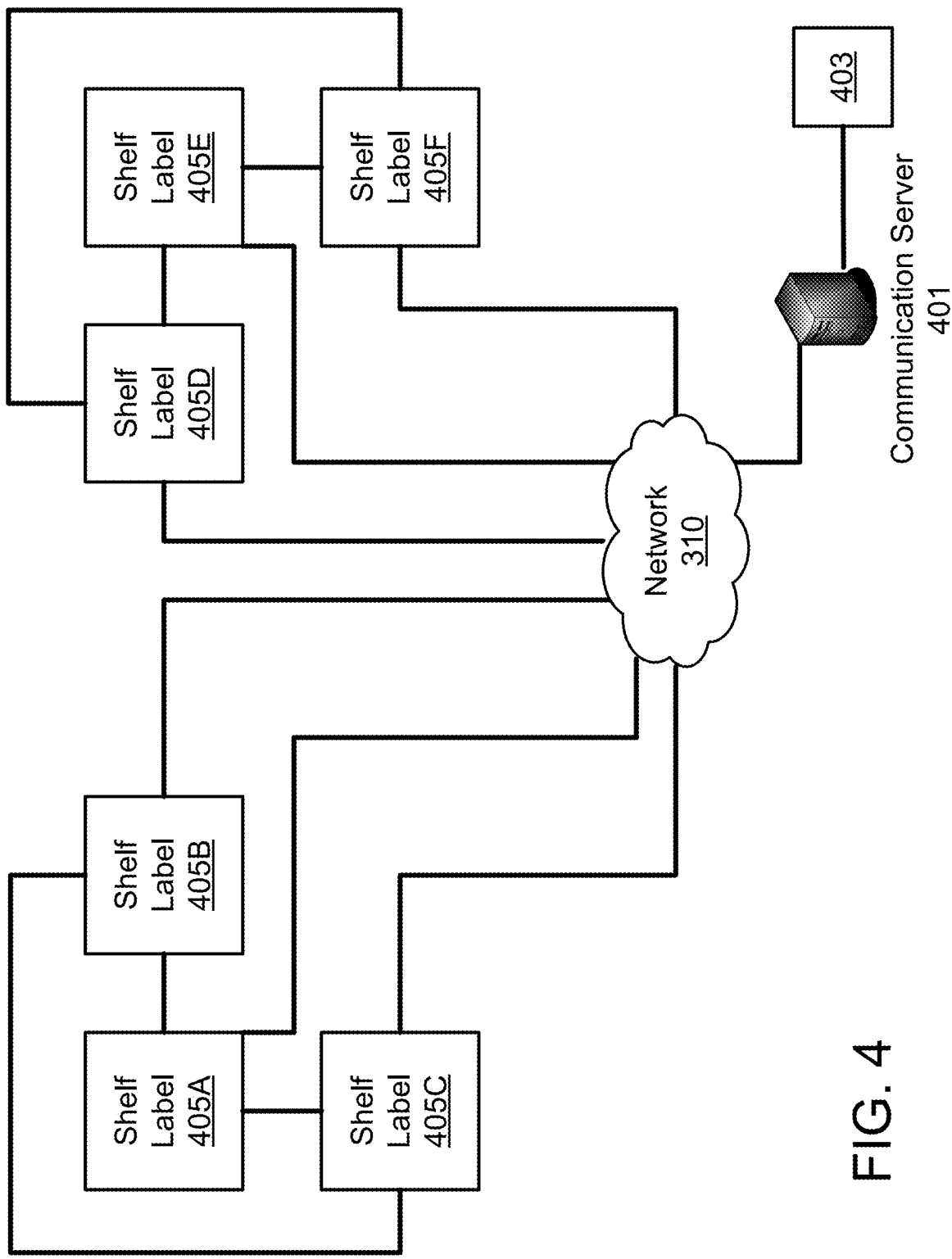
FIG. 4 illustrates an example block diagram of a system for communicating and distributing content to customers according to one or more illustrative aspects of the disclosure.

FIG. 4 illustrates an example block diagram of a system for communicating and distributing content to customers according to one or more illustrative aspects of the disclosure. FIG. 4 illustrates communication capabilities of the shelf label devices as part of a network 310 with a communications server 401 and database 403. In this example, shelf label devices 405A, 405B, and 405C each may communicate with each other such as via a wireless communication capability and may further communicate with shelf label devices 405D, 405E, and 405F, as well as communications server 401 through network 310. Network 310 may be a plurality of access points within a store permitting communication between the various shelf label devices and communication server 401. Shelf label devices 405A, 405B, and 405C may communicate with each other via short range transmission capabilities as these three shelf label devices may be located physically close to each other. For example, shelf label devices 405A, 405B, and 405C, may all be on the same aisle of a store.

Similarly, shelf label devices 405D, 405E, and 405F may communicate with each other via short range transmission capabilities as these three shelf label devices may be located physically close to each other. For example, shelf label devices 405D, 405E, and 405F, may be on the same aisle of a store. However, shelf label devices 405D, 405E, and 405F may be on a different aisle of a store than shelf label devices 405A, 405B, and 405C. As such, it may be necessary for communication between shelf label device 405A and shelf label device 405D to occur through network 310, such as through an access point.

A database 403 may maintain various customer lists associated with the store and may be accessible by a customer through a website of the store through its communication server 401. A communications server 401 may subsequently provide data and instructions to one or more shelf label devices for a particular customer that has a list maintained within database 403 when that customer enters the store and is identified. Communications server 401 also may update shelf label devices as necessary for new data and/or new software upgrades as described herein.

Figure 5:
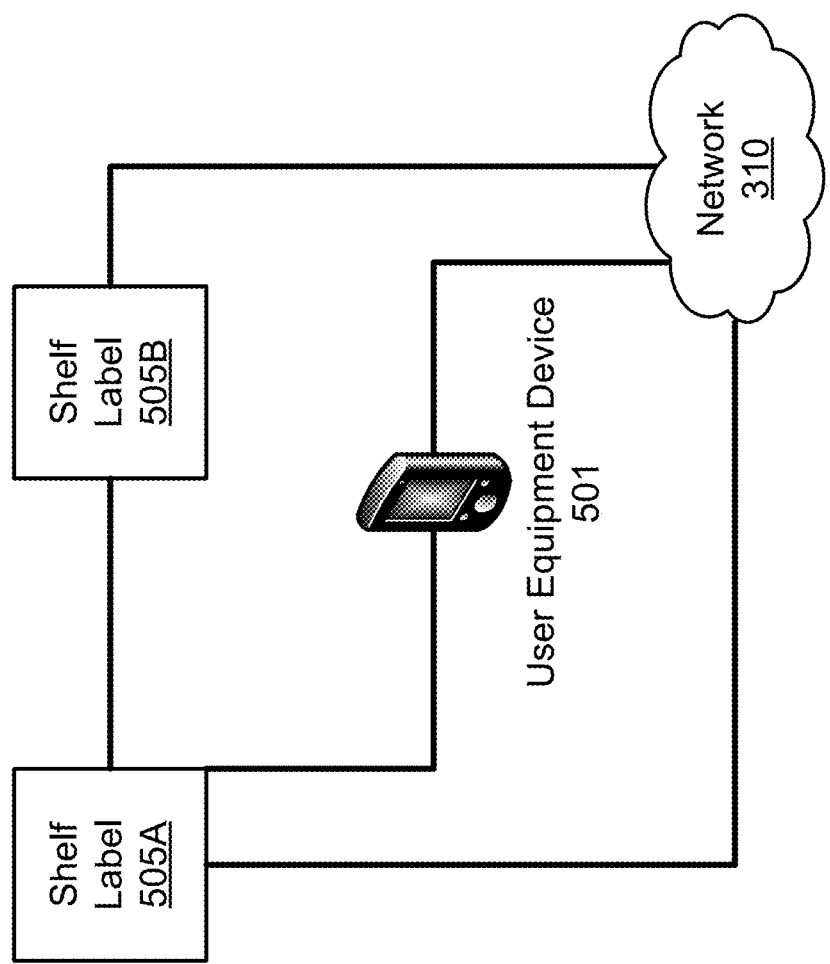
FIG. 5 illustrates an example block diagram of a system for identifying, communicating, and distributing content to customers according to one or more illustrative aspects of the disclosure.

FIG. 5 illustrates an example block diagram of a system for identifying, communicating, and distributing content to customers according to one or more illustrative aspects of the disclosure. FIG. 5 illustrates an example for a shelf label device 505A accessing a user equipment device 501. In this example, user equipment device 501 may be a customer's smart phone. The customer smartphone may include an application associated with a store that is associated with the shelf label device 505A. Shelf label device 505A may access a list maintained on the user equipment device 501 by any of a number of means including accessing the list through a server associated with the shelf label device 505A and the store and wirelessly obtaining the list from the user equipment device 501. In the example of accessing the list to a server associated with the shelf label device 505A, the server may access the list on the user equipment device 501 through network 310. For example a customer may join network 310 of the store and, in doing so, allow the server to access the list on the user equipment device 501. In response, the server may notify the shelf label device 505A and/or shelf label device 505B through network 310. Shelf label device 505A may communicate, as necessary, directly with shelf label device 505B and/or through network 310.

Figure 6:
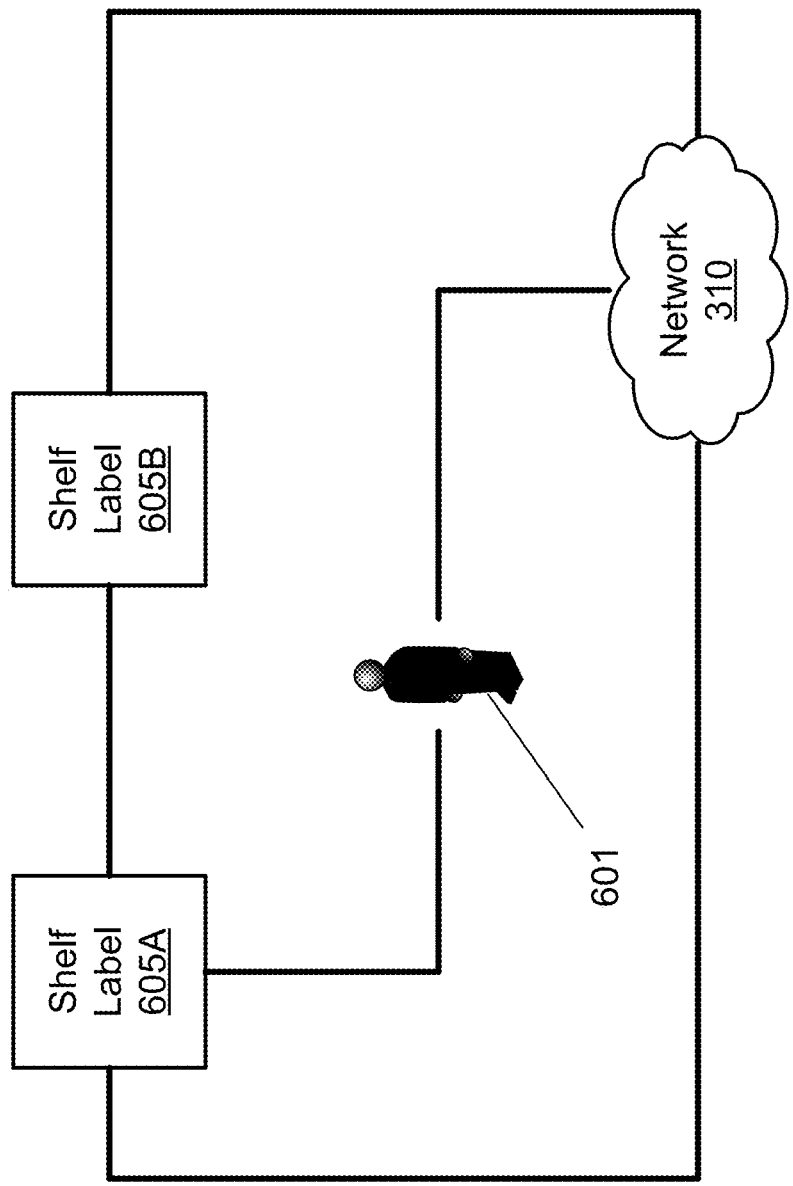
FIG. 6 illustrates another example block diagram of a system for identifying, communicating, and distributing content to customers according to one or more illustrative aspects of the disclosure.

FIG. 6 illustrates another example block diagram of a system for identifying, communicating, and distributing content to customers according to one or more illustrative aspects of the disclosure. FIG. 6 illustrates an example for a shelf label device 605A sensing the presence of a customer 601. In this example, shelf label 605A may detect customer 601 as looking at an item associated with shelf label device 605A. Shelf label device 605A may include a sensor, such as sensor 315, to detect the motion of the customer in front of the shelf label device 605A. In response to determining the presence of customer 601, shelf label device and 605A may notify related shelf label item 605B either directly via short range wireless communication and/or through network 310. In response to sensing of customer 601, and the communication from shelf label device 605A to shelf label device 605B, shelf label device 605A and/or shelf label device 605B may trigger an alert as described herein. If detection of the presence of customer 601 occurs upon entry to the store, network 310 may notify shelf label devices 605A and/or 605B of the presence of customer 601 in the store. Subsequently shelf label 605A may wait to trigger an alert until it is confirmed that customer 601 is in the aisle that shelf labels 605A located within.

Figure 7:
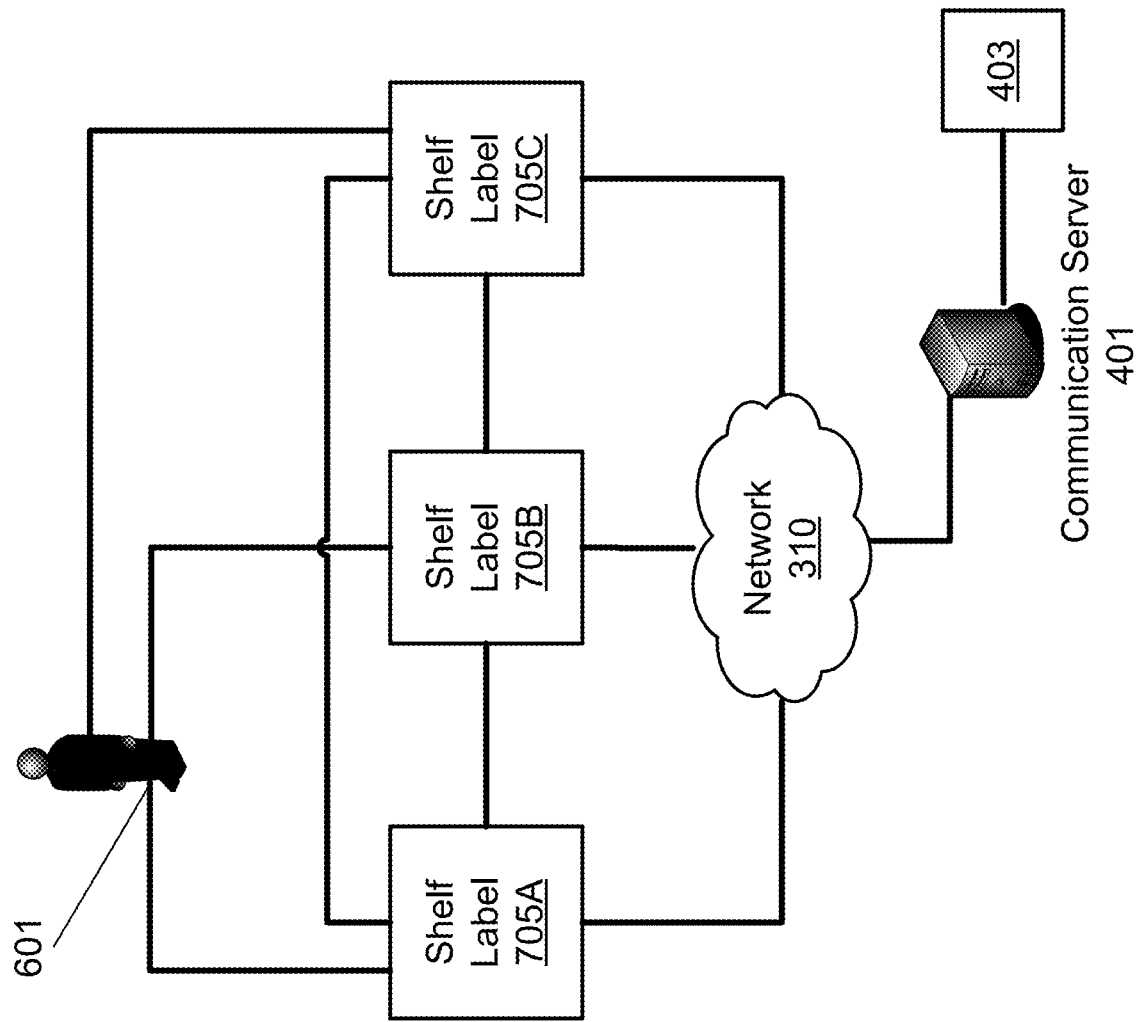
FIG. 7 illustrates another example block diagram of a system for identifying, communicating, and distributing content to customers according to one or more illustrative aspects of the disclosure.

FIG. 7 illustrates another example block diagram of a system for identifying, communicating, and distributing content to customers according to one or more illustrative aspects of the disclosure. FIG. 7 may be an example for tracking movement of a customer 601 through a store in order to deliver content electronically to the customer 601. In this example shelf label device 705A may be configured to sense the presence of customer 601 within its sensing range. In one example, a timestamp may be associated with when the sentencing of the presence of customer 601 occurred by shelf label device 705A. Shelf label device 705B also may detect the presence of customer 601 when the customer is within the sensing range of shelf label device 705B. Another timestamp may be associated with when a sensing of the presence of the customer 601 occurred by shelf label device 705B.

Communications server 401 may receive the two timestamps and determine the time interval between the timestamps. Such information may be used to track the direction and speed of movement of the customer through the store. In addition, the timestamp data may be utilized to capture shopping trend data without compromising a specific shopper's privacy. Various timestamp data for one or more customers may be used in determining directional paths, dwell times, and total shopping times of customers in general. Because the timestamp data may be captured in real time for a variety of different areas of a shopping facility and for a variety of different promotions, times of day, etc., trend data for general shopping within the shopping facility may be determined for a more accurate representation of what is working in promoting sales or products in the shopping facility and what is not working. Such trend data may assist retailers of the shopping facility to understand how lack of a specific product sale may not be limited to a customer not wanting that particular product due to content, price, quantity, alone but may include other factors such as location on a shelf, orientation of the product with respect to other related or similar products, as well as the physical layout of the shopping facility itself.

Additional time interval data may be determined as necessary based on timestamps associated with additional shelf label devices that sense the presence of customer 601. For example shelf label device 705C may sense the presence of customer 601 and the timestamp may be associated with this detection. In response to tracking the movement of the customer through the store, server 401 may direct additional content to be outputted by a shelf label device. As such, if the store has a marketing campaign for a specific manufacturer Z, movement of the customer 601 may be tracked in order to notify shelf label devices associated with items of manufacturer Z and/or items near other items of manufacturer Z when the customer 601 is close and thus the shelf label device should trigger and alert the customer.

Figure 8:
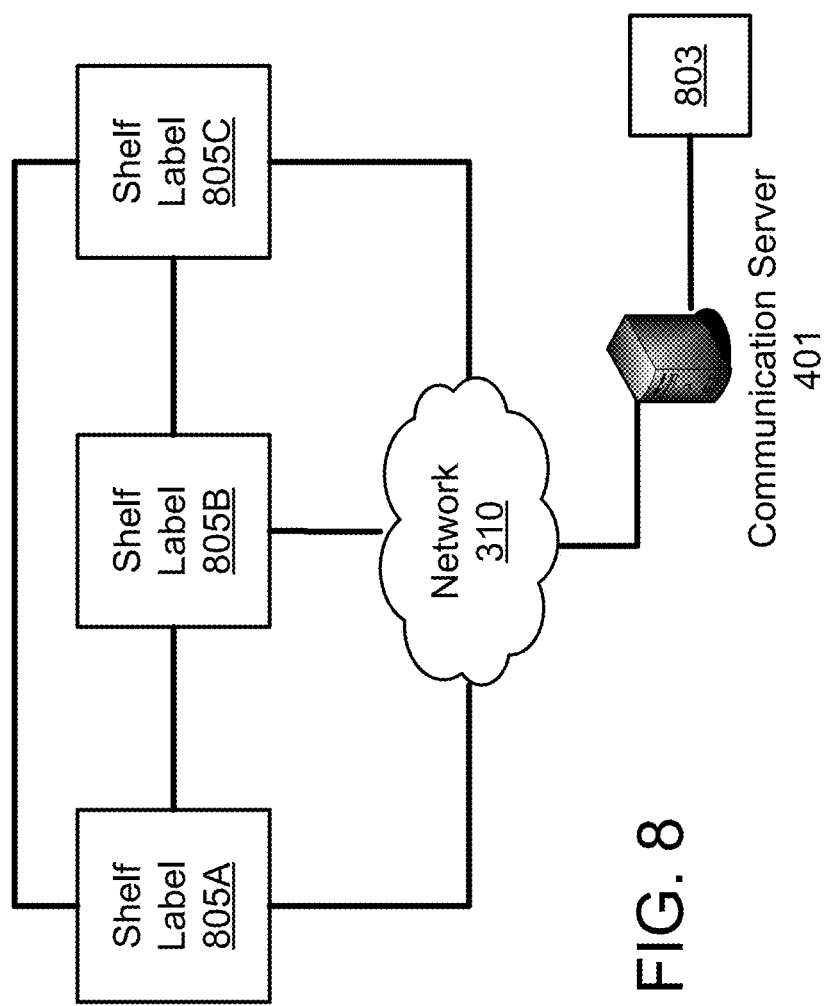
FIG. 8 illustrates an example block diagram of a system for communicating and distributing content to customers according to one or more illustrative aspects of the disclosure.

FIG. 8 illustrates an example block diagram of a system for communicating and distributing content to customers according to one or more illustrative aspects of the disclosure. FIG. 8 may illustrate an example for updating one or more shelf label devices. Shelf label devices 805A, 805B and 805C are shown connected to communication server 401 through network 310. Shelf label devices 805A, 805B, and 805C also are shown as wirelessly connected to each other. Communication server 401 may be connected to an updating database 803. In this example, an update may be needed for data for shelf label device 805B. The update for shelf label device 805B may occur in a number of manners. In one example, communication server 401 may obtain the updated data from database 803 and provide the update through network 310 to shelf label device 805C. In another example, communication server 401 may obtain the updated data from database 803 and provide the update through network 310 to shelf label 805B. Shelf label device 805B may communicate wirelessly with shelf label device 805C to send the update intended for shelf label device 805C to shelf label device 805C.

In another example, communications server 401 may be configured to communicate with only shelf label 805A. In such an example, communications server 401 may obtain the updated data from database 803 and provide the update through network 310 to shelf label device 805A. Shelf label device 805A may be a primary device and may communicate updates for any secondary devices associated with it. For example shelf label device 805B and shelf label device 805C may be secondary devices that do not have direct communication ability with communications server 401. In such an example, any update to shelf label device 805B and/or shelf label device 805C is obtained from its primary device, shelf label device 805A. Such a configuration of primary and secondary devices may assist in alleviating data collision where simultaneous data packet transmission between two or more devices collides in transit. By allowing for simultaneous transmission, one or more of the devices may include some type of channel sensing capability to facilitate simultaneous transmission of data packets by multiple devices and/or control over transmissions to coordinate with secondary devices in passing along necessary data to secondary devices.

Figure 9:
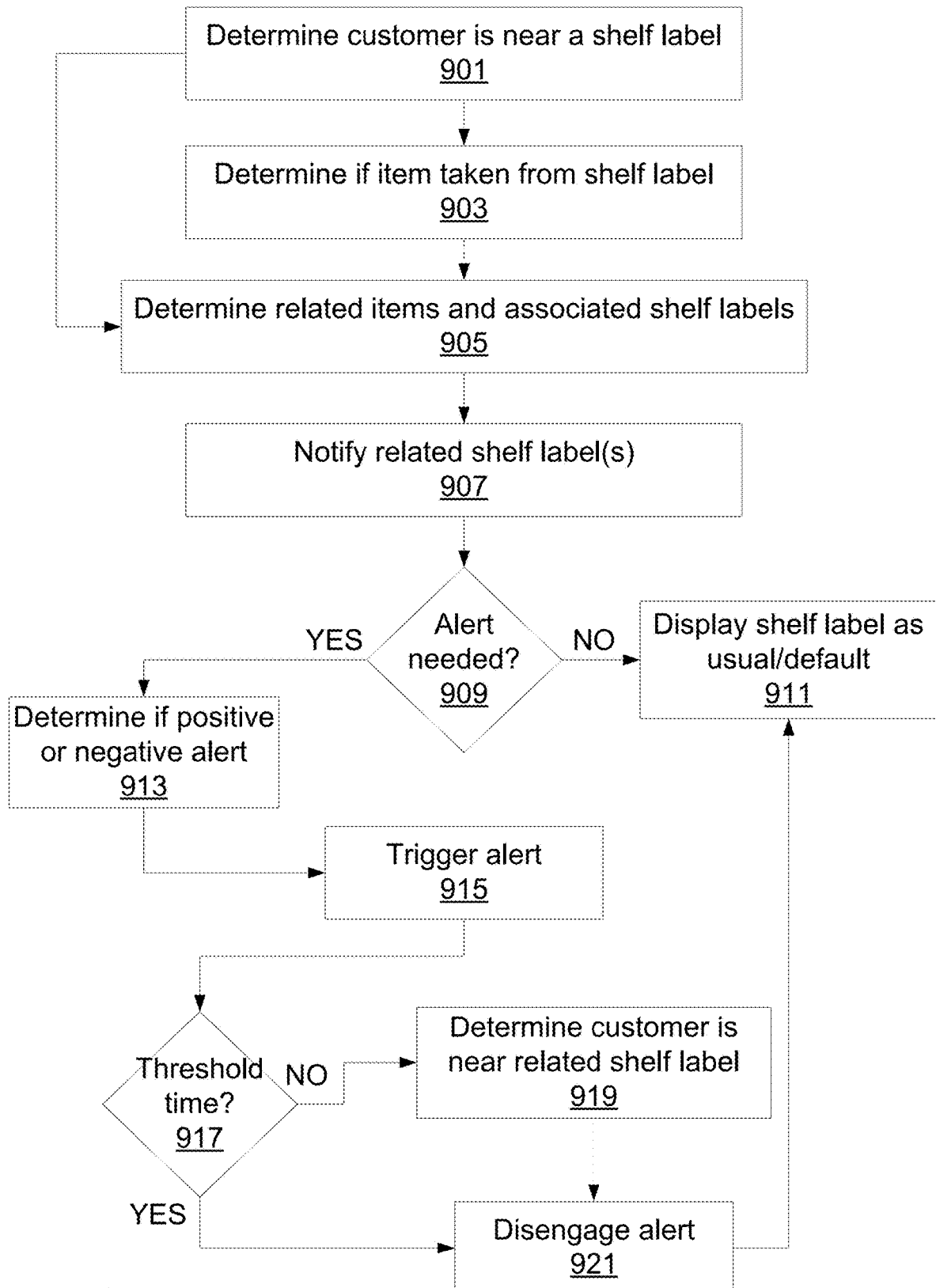
FIG. 9 illustrates an example method of distributing content according to one or more illustrative aspects of the disclosure.

FIG. 9 illustrates an example method of distributing content according to one or more illustrative aspects of the disclosure. In one example, one or more of the steps of FIG. 9 may be implemented by computing device 300 in FIG. 3A and/or a device shown in FIGS. 3B, 4, 5, and/or 6. The process starts and at step 901 a customer is determined to be near the shelf label device. For example customer 601 may be determined to be near shelf label device 105A. Proceeding to step 903 as an optional step, the system may determine if an item was taken from the associated shelf label device before proceeding to step 905. At step 905, the system may determine items related to the item of the shelf label device in step 901 and the associated shelf label devices for such determined items. For example, shelf label device 105C may determine that the items associated with shelf label devices 105D and 105E are related to the item associated with shelf label device 105C. In response, in step 905, a shelf label device may notify its related shelf label device(s). In the example of FIG. 1, shelf label device 105C may notify shelf label devices 105D and 105E. Notification from shelf label device 105C to shelf label devices 105D and 105E may occur wirelessly and/or through a network such as network 310.

Moving to step 909, for the shelf label device in step 901 and/or being notified shelf label devices in step 907, a determination may be made as to whether an alert is needed to be triggered. As described herein, such an alert may be a visual alert, and audio alert, and/or a combination of the two. Such an alert may be outputted on a display of the shelf label device and/or some other component of the shelf label device. If no alert is needed in step 909, the process proceeds to step 911 where the shelf label device displays as usual/default. If the shelf label device was already operating in a usual/default manner, the shelf label device may continue to display in the same manner. However, if a determination in step 909 is that an alert is needed the process proceeds to step 913.

In step 913, the needed alert is determined to be positive or negative. A positive alert may be an example of a related item such as toothpaste to a toothbrush or conditioner to shampoo to attract the customer to purchase the related item. A negative alert may be an example of a related item that is in conflict with another item already in a shopping cart/to be purchased by the customer. For example, an over the counter drug may be in conflict with another over the counter drug that the customer has already taken to purchase. Similarly, if a customer has taken an alcoholic beverage for per purchase, and over the counter drug that reacts to alcohol may have a shelf label device with a triggered negative alert to inform the customer of the conflict.

Moving to step 915, the shelf label device triggers its alert to the customer. The alert may be triggered while detecting the presence of the customer and/or before detecting the presence of the customer. A determination may be made in step 917 to see if a threshold amount of time has been reached before a customer has entered a sensing area of the shelf label device. For example, as shown in FIG. 1, shelf label device 105E may have a triggered negative alert for a customer. Shelf label device 105E may trigger the alert for a threshold period of time until one of two occurrences. If it is determined that the customer is within the sensing area of shelf label device 105E, the trigger is disengaged or the trigger is disengaged if a threshold period of time has been met and the customer is still not within a sensing area of shelf label device 105E.

If the threshold period of time in step 917 has not been, the process proceeds to step 919 where the shelf label device determines that the customer is within its sensing area. In such an example the customer may be looking at the item associated with the shelf label device. The process then proceeds to step 921. If the threshold period of time in step 917 has been met, the process proceeds directly to step 921 where the a learned of the shelf label device may be disengaged before proceeding to step 911 where the shelf label device displays its information in a usual/default manner.

Figure 10:
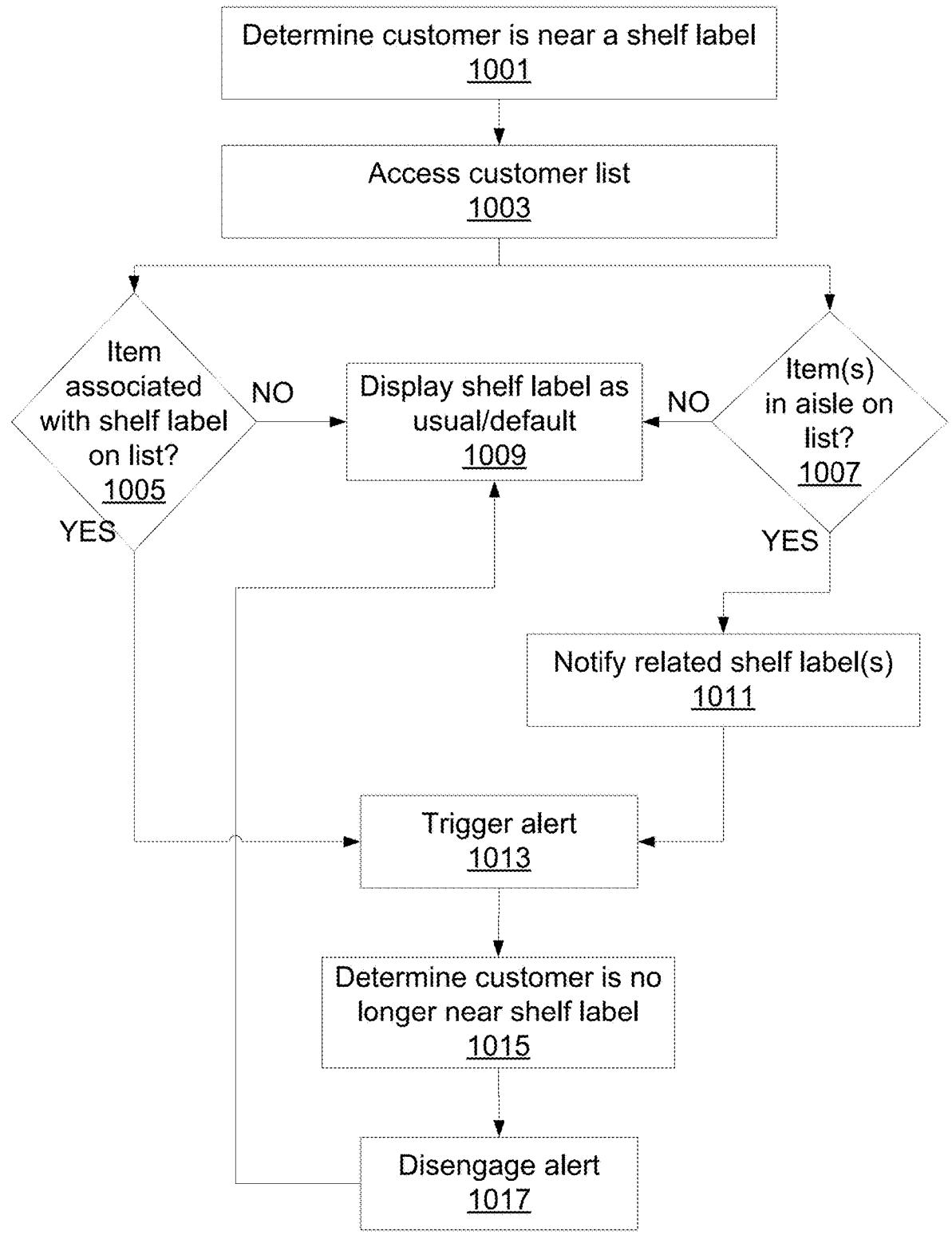
FIG. 10 illustrates another example method of distributing content according to one or more illustrative aspects of the disclosure.

FIG. 10 illustrates another example method of distributing content according to one or more illustrative aspects of the disclosure. In one example, one or more of the steps of FIG. 10 may be implemented by computing device 300 in FIG. 3A and/or a device shown in FIGS. 3B, 4, 5, and/or 6. The process starts and at step 1001 a customer is determined to be near the shelf label device. For example customer 601 may be determined to be near shelf label device 205A. Proceeding to step 1003, a customer list of the customer 601 may be accessed. Such an example may be where the customer list is maintained on a mobile device, such as a smartphone, of customer 601. Having accessed the customer list in step 1003, the shelf label device may perform two functions successively and/or concurrently. In step 1005, a determination is made as to whether the item associated with the shelf label device in step 1001 is on the customer list. If it is determined that the item associated with the shelf label device in step 1001 is on the customer list, the shelf label device will trigger an alert in step 1013. If it is determined in step 1005 that the item associated with the shelf label device is not a customer list, the process proceeds to step 1009 where the shelf label device outputs a display of data in a usual/default manner.

In step 1007, the determination may be made as to whether one or more items that are on the list of the customer are on the same aisle as the shelf label device in step 1001. For example, if the shelf label device in step 1001 is shelf label device 205A, the determination in step 1007 would be that no items in the aisle 201A are also on the list of the customer and therefore proceed to step 1009. If it is determined that other items on the list of the customer are on the same aisle as the shelf label device in step 1001, the process proceeds to step 1011 where the shelf label devices on the same aisle as shelf label device in step 1001 are notified by the shelf label device in step 1001 that the item associated with the shelf label device is on the customer's list. From step 1011, the process proceeds to step 1013 where an alert is triggered on the shelf label device. In the example of FIG. 2, shelf label device 205B may be the shelf label device in step 1001 and shelf label devices 205C, 205D, and 205E maybe even notified shelf label devices in step 1011. In such an example, shelf label devices 205B, 205C, 205D, and 205E all trigger an alert in step 1013.

In step 1015, the shelf label device may determine that a customer is no longer near the shelf label device, such as by determining that the customer is no longer within a sensing area of the shelf label device or that a predetermined period of time has passed. Proceeding to step 1017, the alert at the shelf label device may be disengaged. Such a shelf label device may then display in a usual/default manner in step 1009.

Figure 11:
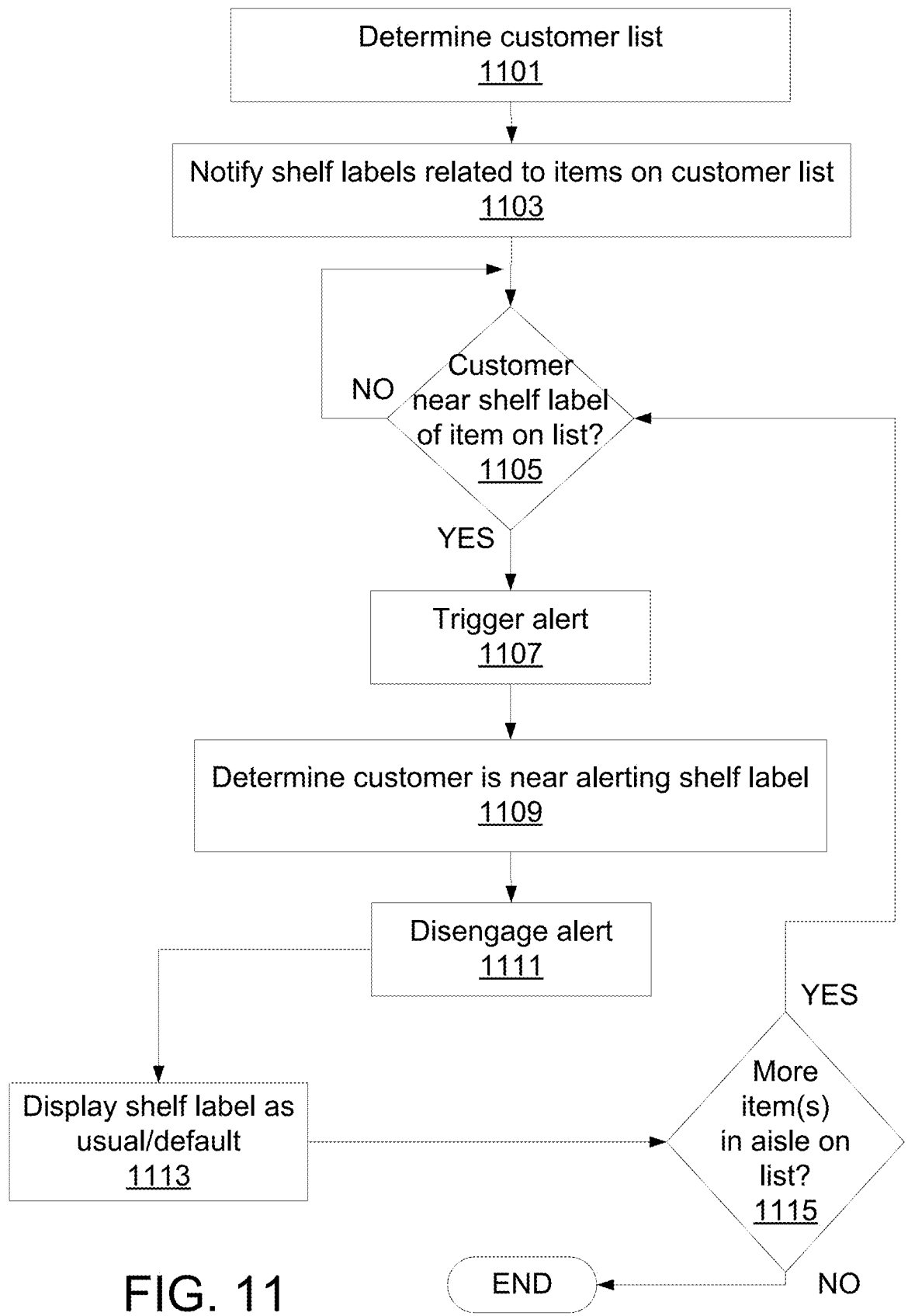
FIG. 11 illustrates another example method of distributing content according to one or more illustrative aspects of the disclosure.

FIG. 11 illustrates another example method of distributing content according to one or more illustrative aspects of the disclosure. In one example, one or more of the steps of FIG. 11 may be implemented by computing device 300 in FIG. 3A and/or a device shown in FIGS. 3B, 4, 5, and/or 6. The process starts and at step 1101 a customer list of a customer, such as customer 601, may be determined. Such an example may be where the customer list is maintained in a database, such as database 403, associated with this server, such as communication server 401, maintained by a store. The list of the customer may have been generated through a website of the store. A server of a store may notify one or more shelf label device is related to items on the customer's list in step 1103. For example, server 401 may notify shelf label device 605A and/or 605B that the item associated with the respective shelf label device is on the list of the customer.

Proceeding to step 1105, a determination may be made as to whether the customer is near one of the shelf label devices of an item on the list of the customer. For example, it may be determined that customer 601 is not within a sensing area of shelf label 605A. In such an example, the process repeats until a shelf label device associated with an item on the customer's list senses the customer within its sensing range. In some examples, the device may sense light, heat, and/or odors. The process moves to step 1107 where an alert for the shelf label device is triggered. In step 1109, the alerting shelf label device from step 1107 determines that the customer is near it. Such an example may be where shelf label device 205C has triggered an alert and senses that the customer is within its sensing range. The alert may be disengaged in step 1111 and proceeding to step 1113, the shelf label device may display in a usual/default manner.

Proceeding to step 1115, a determination may be made as to whether more items on the list to the customer are in the aisle where the customer is. If not, the process may end. If it is determined that more items on the list of the customer are in the aisle that the customer is on, the process may return back to step 1105 until another shelf label device of an item on the list of the customer in that aisle senses the presence of the customer. For example, in FIG. 2, shelf label devices 205D and 205E may be associated with items on the customer's list that the customer has not yet come within a sensing area of either shelf label device.

Figure 12:
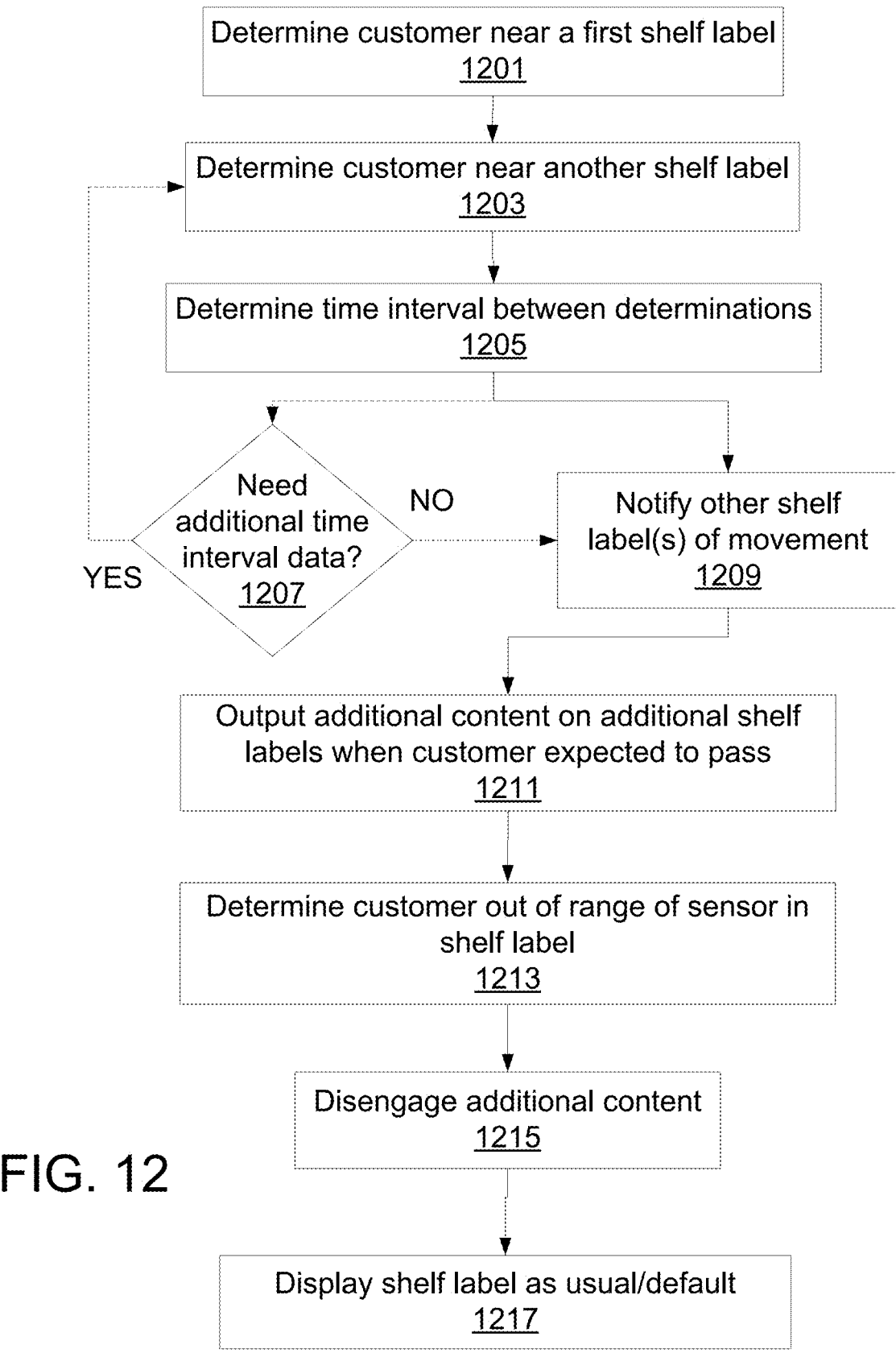
FIG. 12 illustrates another example method of distributing content according to one or more illustrative aspects of the disclosure.

FIG. 12 illustrates another example method of distributing content according to one or more illustrative aspects of the disclosure. In one example, one or more of the steps of FIG. 12 may be implemented by computing device 300 in FIG. 3A and/or a device shown in FIGS. 3B or 7. The process starts and at step 1201, and a customer may be determined to be near a first shelf label device. Such an example may be as shown in FIG. 7 where customer 601 is determined to be near shelf label device 705A. The timestamp of the occurrence of sensing the presence of the customer may be generated by the first shelf label device. This timestamp data may be sent to a server associated with a store, such as communication server 401 in FIG. 7.

In step 1203, the customer may be determined to be near a second shelf label device. Such an example may be as shown in FIG. 7 more customer 601 is determined to be near shelf label device 705B. The timestamp the occurrence of sensing the presence of the customer by the second shelf label device may be generated by the second shelf label device. This timestamp data may be sent to the server associated with the store, such as communication server 401 in FIG. 7. In step 1205, a determination of the time interval between the two determined timestamps may be made. The server of the store, such as communication server 401, may perform the step 1205. An optional step may be conducted in step 1207. In step 1207, a determination may be made as to whether additional time interval that it is needed in order to more accurately detect movement speed and/or direction of the customer. If more time interval data is not needed the process proceeds to step 1209. If additional time interval that it is needed, the process proceeds back to step 1203 where an additional shelf label device may determine the presence of a customer near it. Such an example may be as shown in FIG. 7 where customer 601 is determined to be near shelf label device 705C. The timestamp of the occurrence of sensing the presence of the customer may be generated by the additional shelf label device.

In step 1209, one or more other shelf label devices may be notified of directional movement of the customer and/or speed of movement of the customer. In response, in step 1211 additional content may be outputted on additional shelf label device is when the customer is expected to pass such additional shelf label devices. In step 1213, the shelf label device may determine that the customer is out of range of that sensor and subsequently disengage the additional content in step 1215. The shelf label device may then display content in a usual/default manner in step 1217.

Figure 13:
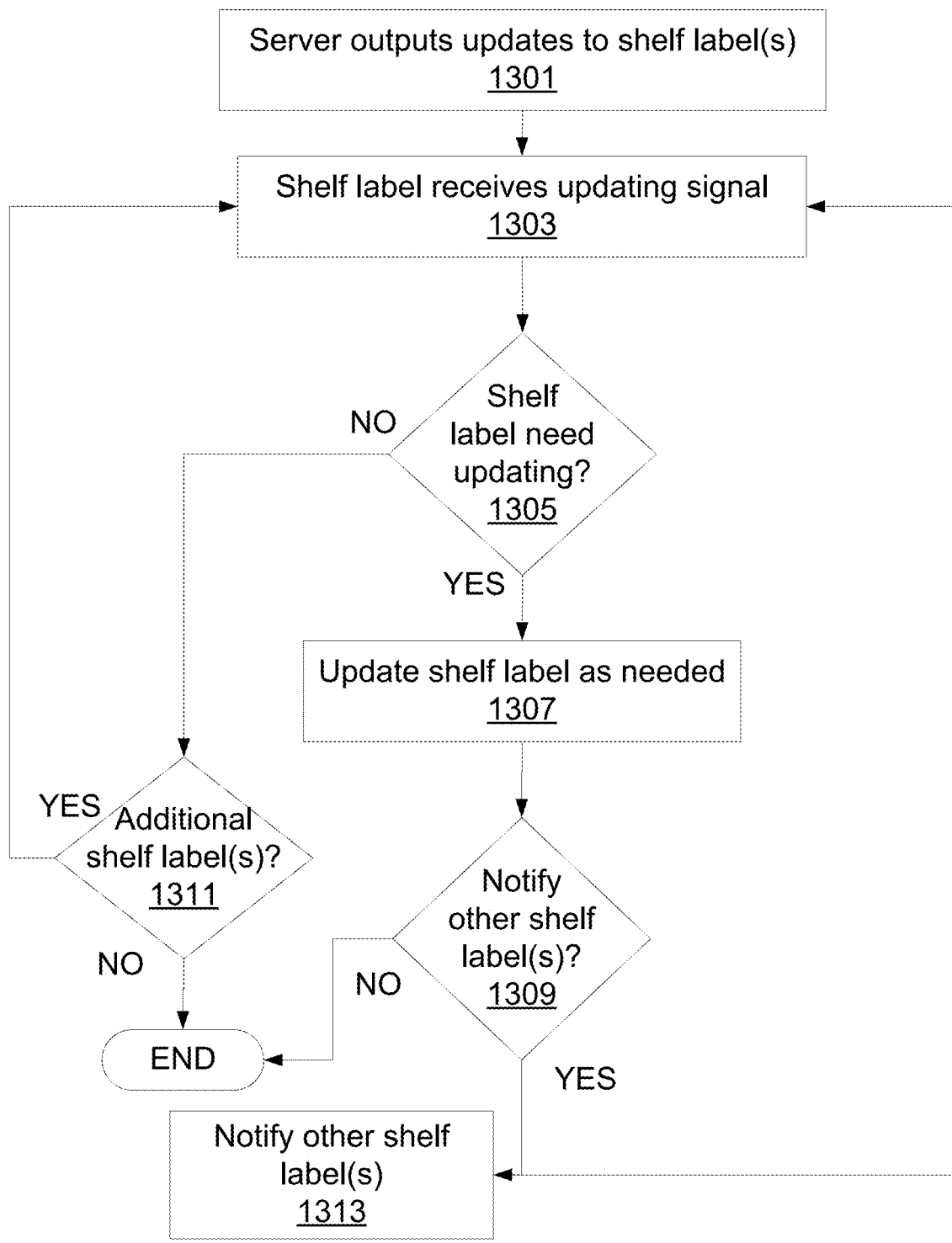
FIG. 13 illustrates another example method of distributing content according to one or more illustrative aspects of the disclosure.

FIG. 13 illustrates another example method of distributing content according to one or more illustrative aspects of the disclosure. In one example, one or more of the steps of FIG. 13 may be implemented by computing device 300 in FIG. 3A and/or a device shown in FIGS. 3B or 8. The process starts and at step 1301, a server associate with the store outputs updates to one or more shelf label devices. Such an example may be where communication server 401 outputs updates from database 803 through network 310 to one or more of shelf label devices 805A, 805B, and/or 805C. In step 1303, a shelf label device receives the updating signal. In such an example of FIG. 8, shelf label device 805A may receive the updating signal in step 1303. In step 1305, the determination may be made as to whether the shelf label device that receives the updating signal in step 1303 needs updating. Such an update may be an update of content for display and/or some type of software upgrade for operational purposes.

If the shelf label device that receives the updating signal in step 1303 did not need updating, the process proceeds to step 1311. In step 1311 a determination is made as to whether there are additional shelf label devices. If there are additional shelf label devices, the process returns back to step 1303 for the additional shelf label device. If there is no additional shelf label device in step 1311, the process ends.

If the shelf label device that receives the updating signal in step 1303 does need updating, the process moves to step 1307 where the shelf label device is updated as needed. For example if the item associated with shelf label device 805A has a change in price where the price is now a lower price than was previously displayed, data for displaying the price of the associated item is an update for the shelf label device 805A.

Proceeding to step 1309, the determination may be made as to whether one or more other shelf label devices need notification of the updating signal. Such an example may be the case where the shelf label device that receives the updating signal in step 1303 is a primary shelf label device. For the example of FIG. 8, shelf label device 805A may be a primary shelf label device and shelf label devices 805B and 805C may be secondary shelf label devices. In such an example, shelf label devices 805B and 805C may not receive the updating signal directly from communication server 401. If no other shelf label device needs notification in step 1309, the process may end. If other shelf label devices need notification in step 1309, the process may precede to step 1313 where one or more other shelf label devices are notified before the process returns back to step 1303 where such in notified shelf label device receives the updating signal from the primary shelf label device.

Figure 14:
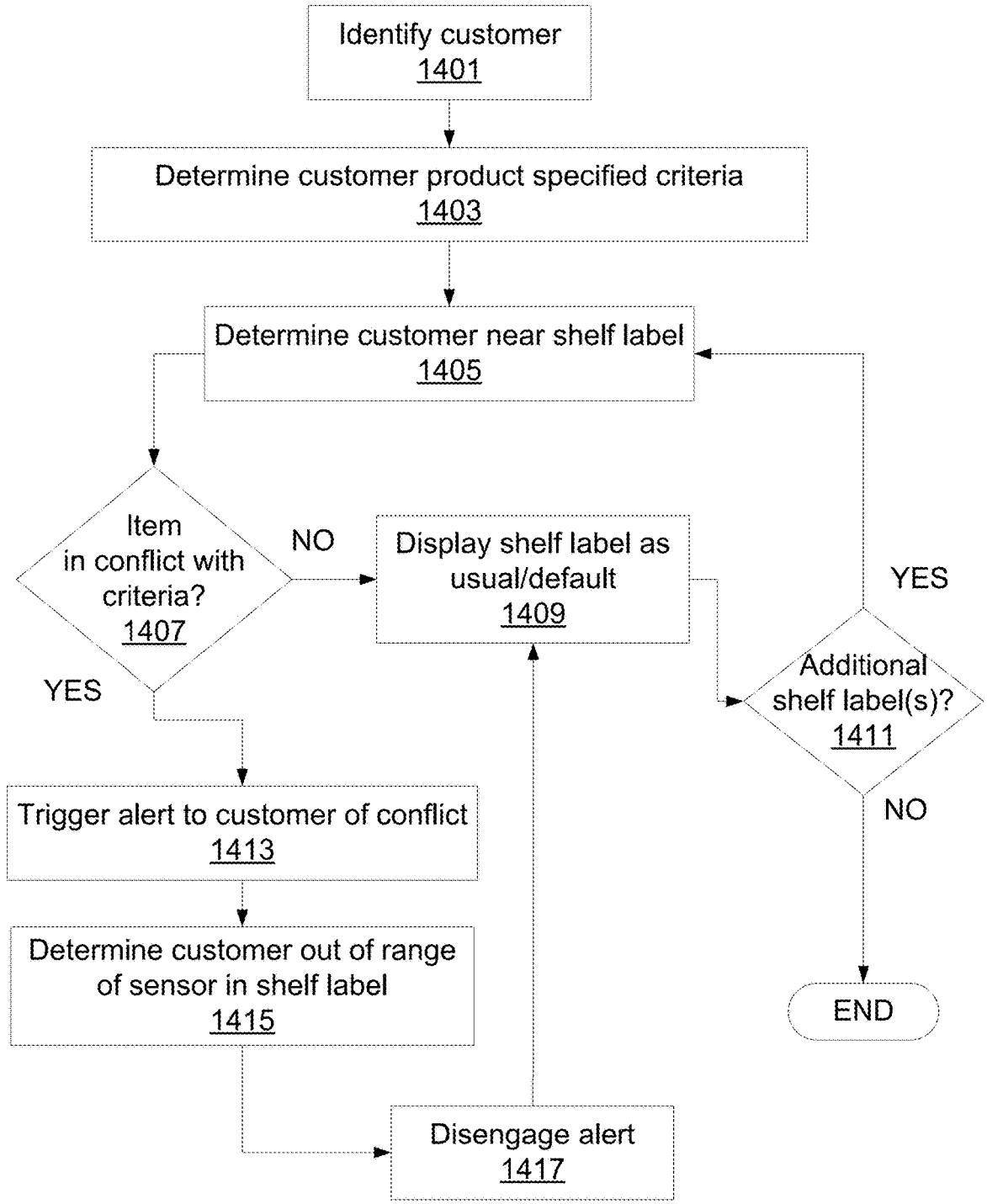
FIG. 14 illustrates another example method of distributing content according to one or more illustrative aspects of the disclosure.

FIG. 14 illustrates another example method of distributing content according to one or more illustrative aspects of the disclosure. In one example, one or more of the steps of FIG. 14 may be implemented by computing device 300 in FIG. 3A and/or a device shown in FIGS. 3B or 7. The process starts and at step 1401, a customer may be identified. The customer may be identified by a customer identification system of a store the customer is entering. As shown in illustrative FIG. 7, customer 601 may be identified by a server, such as communication server 401. Having identified the customer in step 1401, the process moves to step 1403 where the system may determine one or more product purchase criteria entered by the customer. The system may access a database, such as database 403, which includes customer specified/entered product criteria. Examples of customer specified/entered criteria may include that the customer wants to avoid products with gluten or that the customer wants to get a low-fat version/option for a product when available. Other illustrative criteria may be avoiding shellfish products, dairy products, nut products, or even products known to be manufactured in a facility where shellfish, dairy items and/or nuts may be handled. In the example of FIG. 14, the system may identify the customer and determine that the customer is currently seeking to avoid any product manufactured in a facility that handles nut items.

Moving to step 1405, a shelf label device may determine that the customer is near it by sensing the customer's presence. The shelf label device may be associated with a candy item that does not itself contain nuts, but may be known to be manufactured in a facility that processes nuts. In 1407, a determination may be made as to whether the item associated with the shelf label device is an item that is in conflict, e.g., not recommended to be taken by the customer, with one or more of the customer product specified criteria. If the determination from step 1407 is that the item is not in conflict, the process moves to step 1409 where the shelf label device displays content in a usual/default manner.

If the determination from step 1407 is that the item is in conflict, the process moves to step 1413 where the shelf label device triggers an alert to draw the customer's attention to the identified conflict. For example, the shelf label device may turn the display red in color and blink and then include text to indicate that the item associated with the shelf label device should not be purchased since it is in conflict with a customer product specified criteria. In accordance with at least one embodiment, a list of the customer may be updated in response to determining a conflict between a criteria of the customer, such as gluten-free products only, and an item for purchase on the customer's list. An update may include removing the conflicting product from the list of the customer all together, changing the conflicting product to a non-conflicting related product (pasta by Brand X with gluten to pasta by Brand X that is gluten-free), or notifying the customer as to the conflict. A notification may be warranted as the customer may still want to purchase the conflicting product (such as a situation where there is no real conflict, e.g., the product is for someone else).

In step 1415, the shelf label device may determine that the customer no longer is in sensing range of the device. Such a circumstance may be after the customer has moved on from the item associated with the shelf label device. Upon determining that the customer is no longer within the sensing range of the shelf label device, the shelf label device may disengage the alert to the customer in step 1417. The process then may proceed to step 1409 where the shelf label device displays content in a usual/default manner.

From step 1409, the process may proceed to step 1411 where a determination is made as to whether there is an additional shelf label device that senses the customer. For example, having passed by a first shelf label device, the customer may pass a second shelf label device. If the determination from step 1411 is that an additional shelf label device senses the customer, the process may return to step 1405 for the additional shelf label device. If the determination from step 1411 is that no additional shelf label device senses the customer, the process may end.

The various features described above are merely non-limiting examples, and can be rearranged, combined, sub-divided, omitted, and/or altered in any desired manner. For example, features of the computing device described herein (which may be one the devices illustrated in FIG. 1) can be subdivided among multiple processors and computing devices. The true scope of this patent should only be defined by the claims that follow.

The invention claimed is:
1. A shelf label device comprising:
at least one processor;
at least one sensor;
a display; and
at least one memory storing computer executable instructions that, when executed by the at least one processor, cause the shelf label device to perform the steps of:
determining an identity of an individual from a mobile device within a sensing area of the at least one sensor and in communication with a network of a store, the shelf label device configured to provide information about a first product on a first shelf in the store on which the shelf label device is attached, and accessing a database to determine, based upon the determined identity of an individual, a list of products for purchase by the individual at the store;

determining, based upon the determined list of products for purchase, whether to notify a second shelf label device, the second shelf label device comprising a display, at least one processor and at least one sensor and configured to provide information about a second product on a second shelf in the store on which the second shelf label device is attached, to trigger an alert at the second shelf label device; and in response to determining to notify, transmitting a notification to trigger the alert at the second shelf label device upon sensing that the mobile device is within a sensing area of the at least one sensor of the second shelf label device.

2. The shelf label device of claim 1, wherein the alert includes at least one of: an audio alert, at least one flashing light, and data outputted on the display of the second shelf label device.

3. The shelf label device of claim 1, wherein the notification is an instruction that the first product on the first shelf in the store on which the shelf label device is attached is in conflict with the second product on the second shelf in the store on which the second shelf label device is attached.

4. The shelf label device of claim 1, wherein the computer executable instructions, when executed by the at least one processor, cause the shelf label device to perform the step of determining whether the second product on the second shelf in the store on which the second shelf label device is attached is on the list of products for purchase.

5. The shelf label device of claim 1, wherein the computer executable instructions, when executed by the at least one processor, cause the shelf label device to perform the step of determining, based upon the determined list of products for purchase, whether to notify a third shelf label device, the third shelf label device comprising at least one processor, at least one sensor, and a display, and configured to provide information about a third product on a third shelf in the store on which the third shelf label device is attached, to trigger an alert at the third shelf label device, and in response to determining to notify, transmitting a notification to trigger the alert at the third shelf label device upon sensing that the mobile device is within a sensing area of the third shelf label device.

6. The shelf label device of claim 1, wherein the notification is an instruction that the second product on the second shelf in the store on which the second shelf label device is attached is in conflict with one or more customer product specified criteria associated with the determined identity of an individual.

7. The shelf label device of claim 1, wherein the notification is transmitted via the network.

8. A system comprising:
a display configured to provide information about a first product on a first shelf on which a first shelf label device is attached;
a sensor configured to determine whether an individual is within a sensing area of the first shelf label device;
a processor, operatively connected to the display and the sensor, configured to determine whether to notify an occurrence of a determination that the individual is within the sensing area of the first shelf label device to at least one second shelf label device; and
a network interface configured to transmit a notification to the at least one second shelf label device that the individual is within the sensing area of the first shelf label device, the notification being an instruction for triggering an alert at the at least one second shelf label device, wherein the second shelf label device is attached to a second shelf and the first shelf is different from the second shelf.

9. The system of claim 8, further comprising
the at least one second shelf label device, the at least one second shelf label device including:
a display configured to provide information about a second product on a shelf on which the at least one second shelf label device is attached;
a network interface configured io receive the notification: and
a processor, operatively connected to the display and the network interface configured to trigger the alert based on the notification by instructing an output of non-default data.

10. The system of claim 9, wherein the alert includes at least one of: an audio alert, at least one flashing light, and data outputted on the display of the at least one second shelf label device.

11. The system of claim 8, wherein the notification is an instruction that the first product on the first shelf on which the first shelf label device is attached is in conflict with a product on an at least one second shelf on which the at least one second shelf label device is attached.

12. The system of claim 8, the at least one second shelf label device comprising:
a sensor configured to determine whether the individual is within a sensing area of the at least one second shelf label device; and
a processor operatively connected to the sensor of the at least one second shelf label device, configured to disengage the alert at the at least one second shelf label device based upon determining that the individual is within the sensing area of the at least one second shelf label device.

13. The system of claim 12, wherein the sensor is further configured to determine whether the individual is within the sensing area of the at least one second shelf label device in a threshold period of time, and the processor is further configured to disengage the alert at the at least one second shelf label device based upon determining the individual is within the sensing area of the at least one second shelf label device in the threshold period of time.

14. The system of claim 12, wherein the processor is further configured to output an instruction to output default data at the least one second shelf label device.

15. The system of claim 8, the at least one second shelf label device comprising:
a sensor configured to determine \whether the individual is within a sensing area of the at least one second shelf label device: and
a processor, operatively connected to the sensor of the at least one second shelf label device, configured to engage the alert at the at least one second shelf label device based upon determining that the individual is within the sensing area of the at least one second shelf label device.

16. The system of claim 8, wherein an instruction for triggering an alert at the at least one second shelf label device an instruction for triggering a plurality of alerts at a plurality of the at least one second shelf label device to draw the individual to a third shelf label device.

17. The system of claim 8, the processor further configured to determine a list of products for purchase by the individual, and determine whether the first product is on the list of products, wherein the list of products for purchase by the individual is determined based on accessing data from a mobile device of the individual, receiving data representative of the list of products from a third shelf label device, or receiving data representative of the list of products from a server.

18. The system of claim 17, the processor further configured to trigger an alert at the first shelf label device upon determining the first product is on the list of products.

19. The system of claim 17, the processor further configured to determine whether at least one second product associated with the at least one second shelf label device is on the list of products, the at least one second shelf label device configured to provide information about the at least one second product on at least one second shelf on which the at least one second shelf label device is attached.

20. The system of claim 19, wherein the processor is further configured to determine whether to notify an occurrence of a determination that the individual is within the sensing area of the first shelf label device to at least one second shelf label device based upon a determination that the at least one second product is on the list of products.

* * * * *